United States Patent
Sun et al.

(10) Patent No.: US 12,136,186 B2
(45) Date of Patent: Nov. 5, 2024

(54) SUPER RESOLUTION IMAGE PROCESSING METHOD AND APPARATUS

(71) Applicant: HUAWEI TECHNOLOGIES CO., LTD., Guangdong (CN)

(72) Inventors: Long Sun, Shenzhen (CN); Baiqi He, Shenzhen (CN); Meng Chen, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 17/687,298

(22) Filed: Mar. 4, 2022

(65) Prior Publication Data
US 2022/0188976 A1   Jun. 16, 2022

Related U.S. Application Data
(63) Continuation of application No. PCT/CN2020/108829, filed on Aug. 13, 2020.

(30) Foreign Application Priority Data

Sep. 6, 2019  (CN) .......................... 201910840356.9

(51) Int. Cl.
*G06T 3/4053* (2024.01)
*H04N 19/176* (2014.01)
(Continued)

(52) U.S. Cl.
CPC ......... *G06T 3/4053* (2013.01); *H04N 19/176* (2014.11); *H04N 19/513* (2014.11); *H04N 19/85* (2014.11)

(58) Field of Classification Search
CPC .. G06T 3/4053; H04N 19/176; H04N 19/513; H04N 19/85
See application file for complete search history.

(56) References Cited

U.S. PATENT DOCUMENTS

| | | | |
|---|---|---|---|
| 2011/0293014 A1* | 12/2011 | Nakagami ............ | H04N 19/503 375/E7.125 |
| 2014/0328400 A1* | 11/2014 | Puri ..................... | H04N 19/119 375/240.16 |

(Continued)

FOREIGN PATENT DOCUMENTS

| | | |
|---|---|---|
| CN | 103069802 A | 4/2013 |
| CN | 109087247 A | 12/2018 |

(Continued)

OTHER PUBLICATIONS

Song et al., "Video Super-Resolution Algorithm Using Bi-Directional Overlapped Block Motion Compensation and On-the-Fly Dictionary Training," IEEE Transactions on Circuits and Systems for Video Technology, vol. 21, No. 3, Mar. 2011, 12 pages.

(Continued)

*Primary Examiner* — Kenny A Cese
(74) *Attorney, Agent, or Firm* — Fish & Richardson P.C.

(57) ABSTRACT

Example image processing methods and apparatuses are disclosed. One example image processing method includes obtaining a video stream, where the video stream includes a first frame of image, a second frame of image, and a third frame of image that are adjacent in time sequence. The video stream can then be decoded to obtain a first alignment frame, a second alignment frame, and at least one residual between the first frame of image, the second frame of image, and the third frame of image. At least one residual frame can then be generated based on the at least one residual. Super resolution processing can then be performed on the second frame of image based on the at least one residual frame, the first alignment frame, and the second alignment frame to obtain an additional second frame of image obtained after super resolution.

18 Claims, 11 Drawing Sheets

(51) Int. Cl.
  *H04N 19/513* (2014.01)
  *H04N 19/85* (2014.01)

(56) References Cited

U.S. PATENT DOCUMENTS

| | | | | |
|---|---|---|---|---|
| 2015/0312588 A1* | 10/2015 | Yamamoto | ............ | H04N 19/463 |
| | | | | 375/240.15 |
| 2019/0007699 A1* | 1/2019 | Liu | ....................... | H04N 19/139 |
| 2020/0084452 A1* | 3/2020 | Liao | ....................... | H04N 19/159 |

FOREIGN PATENT DOCUMENTS

| | | |
|---|---|---|
| CN | 110062164 A | 7/2019 |
| JP | 2010015241 A | 1/2010 |

OTHER PUBLICATIONS

Kappeler et al., "Video Super-Resolution With Convolutional Neural Networks," IEEE Transactions on Computational Imaging, vol. 2, No. 2, Jun. 2016, 14 pages.

Extended European Search Report in European Appln No. 20860488.4, dated Oct. 18, 2022, 8 pages.

ITU-T H.261 (Mar. 1993), "Line Transmission of Non-Telephone Signals, Video Codec for Audiovisual Services at p x 64 kbits," Mar. 1993, 29 pages.

ITU-T H.262 Amendment 4 (Feb. 2012), "Series H: Audiovisual and Multimedia Systems; Infrastructure of audiovisual services—Coding of moving video Information technology; Generic coding of moving pictures and associated audio information: Video: Frame packing arrangement signalling for 3D content," Feb. 2012, 238 pages.

ITU-T H.263 (Jan. 2005), "Series H: Audiovisual and Multimedia Systems; Infrastructure of audiovisual services—Coding of moving video; Video coding for low bit rate communication," Jan. 2005, 226 pages.

ITU-T H.264 (Jun. 2019), "Series H: Audiovisual and Multimedia Systems; Infrastructure of audiovisual services—Coding of moving video; Advanced video coding for generic audiovisual services," Jun. 2019, 836 pages.

ITU-T H.265 (Feb. 2018), "Series H: Audiovisual and Multimedia Systems; Infrastructure of audiovisual services—Coding of moving video; High efficiency video coding," Feb. 2018, 692 pages.

PCT International Search Report and Written Opinion issued in International Application No. PCT/CN2020/108829 on Nov. 17, 2020, 15 pages (with English translation).

\* cited by examiner

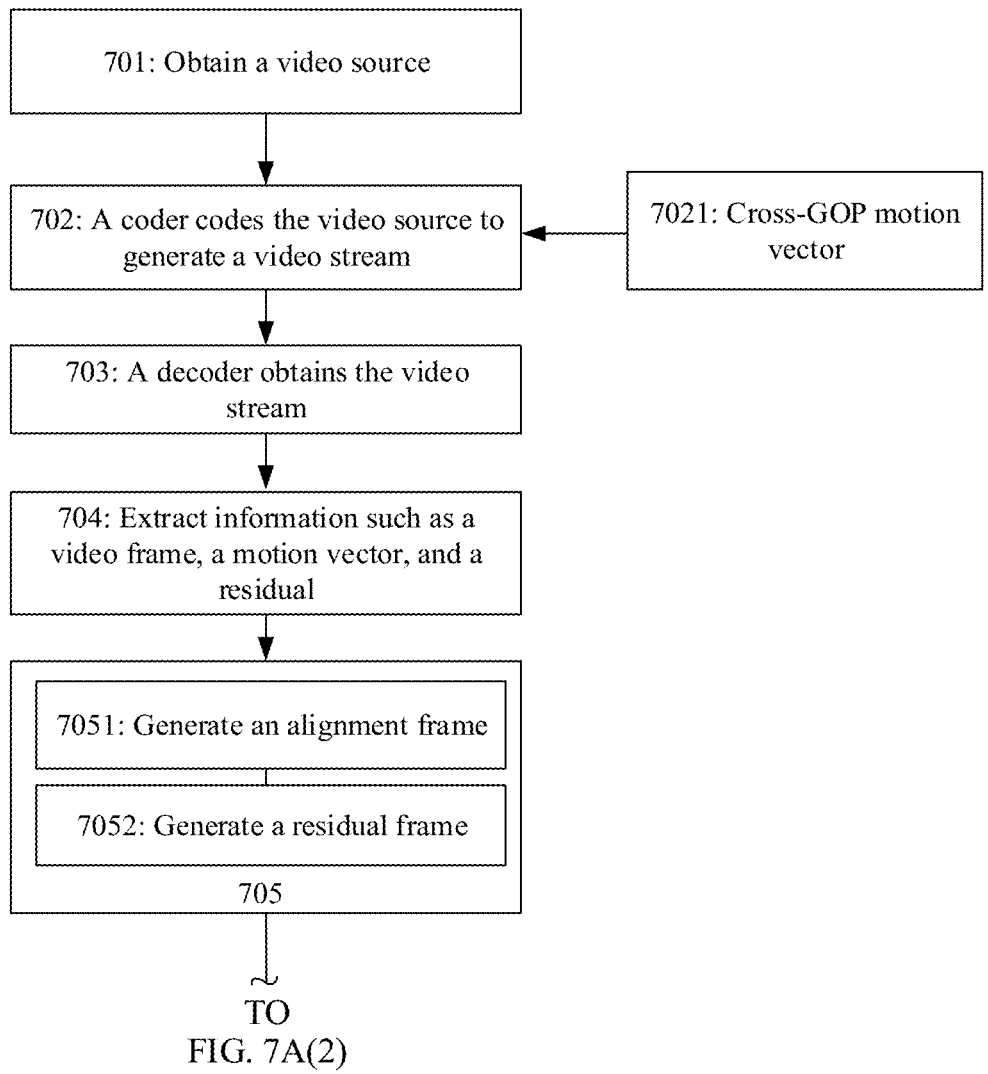
FIG. 7A(1)

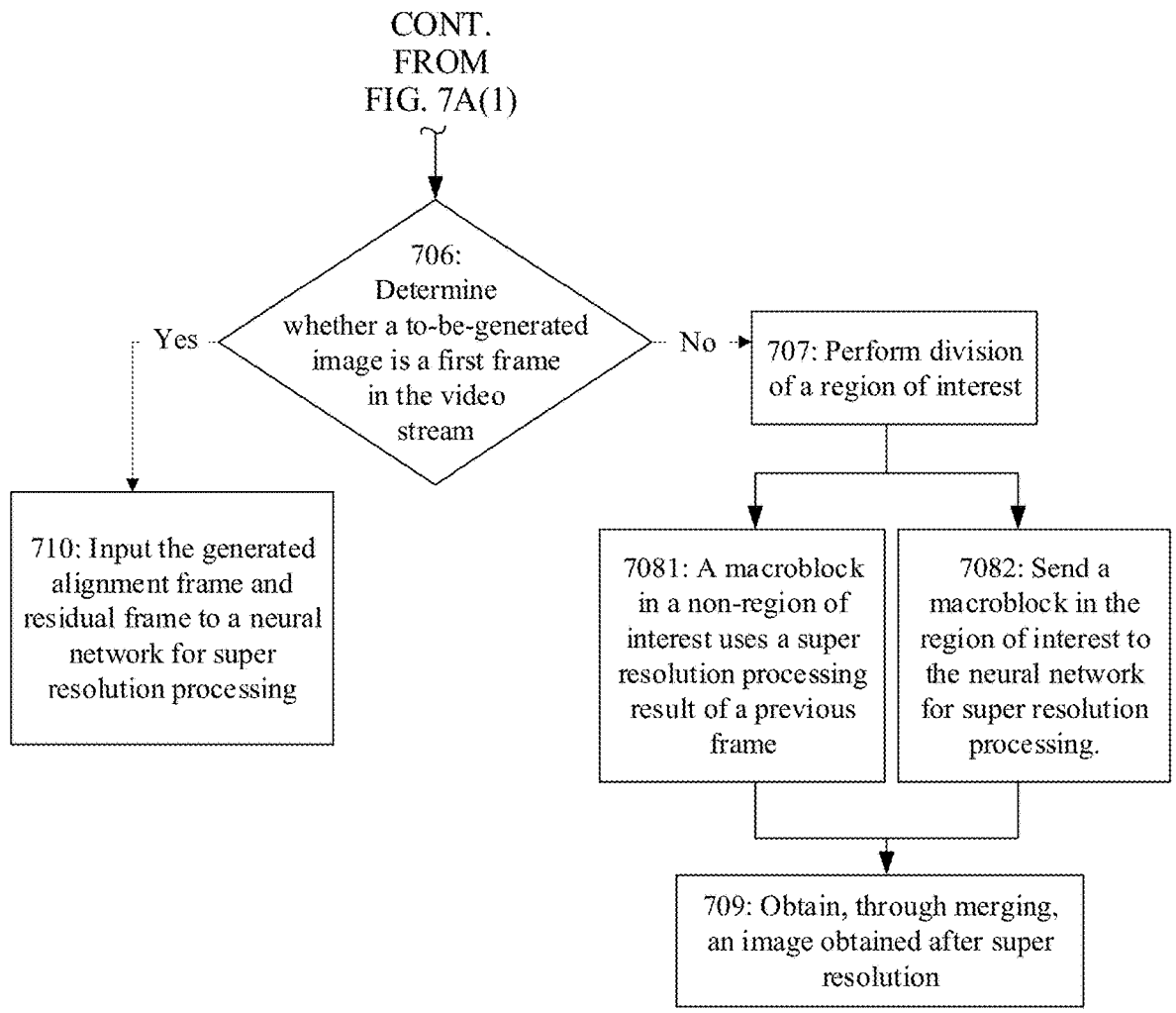
FIG. 7A(2)

| Super resolution block in a previous frame | Image obtained after super resolution | Super resolution block in a current frame |

SUPER RESOLUTION IMAGE PROCESSING METHOD AND APPARATUS

CROSS-REFERENCE TO RELATED APPLICATIONS

This application is a continuation of International Application No. PCT/CN2020/108829, filed on Aug. 13, 2020, which claims priority to Chinese Patent Application No. 201910840356.9, filed on Sep. 6, 2019. The disclosures of the aforementioned applications are hereby incorporated by reference in their entireties.

TECHNICAL FIELD

This application relates to the field of image processing technologies, and in particular, to an image processing method and apparatus, to generate a clear image in a process of performing super resolution on an image.

BACKGROUND

With increasing popularity of devices such as mobile phones, tablets, and smart televisions, and improvement of mobile communications technologies, services such as short videos, streaming media videos, and real-time video calls spring up and occupy increasingly more terminal screens. In order that when a user experiences these video services, not only video playback smoothness in an uncertain network condition can be satisfied, but also edge storage costs and overheads are reduced, a video transmitted to the user usually does not have high resolution, and has blurred picture quality and negative effects such as a blocking artifact and edge aliasing. To eliminate these negative effects, and improve picture quality without increasing an edge storage amount and an amount of transmitted data, a super resolution technology usually may be used. The super resolution technology may also be referred to as the "super resolution technology".

The super resolution technology mainly refers to an important computer vision and image processing means for restoring a low-resolution image to a high-resolution image, and is particularly used in fields related to a medical image, safety monitoring, and television entertainment. A difficulty of the super resolution technology is that a low-resolution image loses an amount of information related to a high-frequency portion, and negative effects caused by a restoration capability of a photosensitive element of a camera, a compression and coding loss, a packet loss on a transmission channel, and the like are added to the low-resolution image.

In a conventional image feature-based super resolution algorithm, restoration is usually performed from aspects of denoising, filtering, edge contour analysis, extraction and fitting, frequency domain information restoration through wavelet transform, and the like. With development of the field related to deep learning, increasingly more work has been shifted to performing super resolution by using a convolutional neural network model, and a breakthrough result has been achieved. Referring to FIG. 1, current deep learning-based super resolution work may be divided into three directions: single image super resolution (single image super resolution, SISR), sequence super resolution (sequence super resolution, SSR), and reference super resolution (reference super resolution, RSR).

In SISR, only a single frame of image is sent to a neural network for super resolution processing. In SSR, a plurality of consecutive frames of images in a video stream are sent to the neural network for super resolution processing. In RSR, an image on which super resolution is previously performed or a pre-placed image template with a special texture is input, for super resolution processing, to the neural network together with an input image/frame sequence. A common problem exists based on the foregoing three research directions. To be specific, in a super resolution process, information about a high-frequency portion is missing from a low-resolution frame of image, and the missed information about the high-frequency portion can hardly be restored by using a single image. Because the information about the high-frequency edge portion of the image is missing, resolution of an image obtained after super resolution is low, which affects viewing experience of a user.

SUMMARY

Embodiments of this application disclose an image processing method, to resolve a problem that an image obtained after super resolution has low resolution due to missing of high-frequency information of an image generated during super resolution.

To resolve the technical problem, this application discloses the following technical solutions.

According to a first aspect, an embodiment of this application provides an image processing method. The method may be applied to a receive-end device, such as a destination device or a decoder. Specifically, the method includes:
  obtaining a video stream, where the video stream includes a first frame of image, a second frame of image, and a third frame of image that are adjacent in time sequence; decoding the video stream to obtain a first alignment frame, a second alignment frame, and at least one residual between the first frame of image, the second frame of image, and the third frame of image; generating at least one residual frame based on the at least one residual; and performing super resolution processing on the second frame of image based on the at least one residual frame, the first alignment frame, and the second alignment frame to obtain a second frame of image obtained after super resolution.

The first alignment frame is generated after the first frame of image moves a pixel block towards the second frame of image based on a first motion vector, the second alignment frame is generated after the third frame of image moves a pixel block towards the second frame of image based on a second motion vector, and the residual is a pixel difference between each macroblock in a previous frame of image and each macroblock in a subsequent frame of image after the previous frame of image performs motion compensation towards the subsequent frame of image based on a motion vector.

According to the method provided in the aspect, video frame alignment and residual accumulation are performed by using motion vector information and residual information in a video codec process, and an alignment frame and a residual frame are used as inputs of a neural network. Because high-frequency information is output after an accumulated frame passes through the neural network, so that an edge detail can be enhanced by attaching the high-frequency information back to a luminance channel, thereby compensating for a problem in a super resolution process that image resolution is low because information about a high-frequency portion is missing from a low-resolution video frame. According to the method, video picture quality is improved without increasing hardware costs.

With reference to the first aspect, in a possible implementation of the first aspect, the generating at least one residual frame based on the at least one residual includes: generating a first residual frame based on a first residual.

The first residual and the first alignment frame satisfy the following relationship:

$$I_i^{(t2)} = I_{i-T_i^{(t2)}}^{(t1)} + \Delta_i^{(t2)},$$

where
$I_i^{(t2)}$ represents the second frame of image, $$I_{i-T_i^{(t2)}}^{(t1)}$$

represents the first alignment frame, $\Delta_i^{(t2)}$ represents the first residual, i represents a macroblock in the first frame of image, $i-T_i^{(t2)}$ represents a macroblock obtained after the macroblock i moves based on a motion vector $T_i^{(t2)}$ corresponding to the macroblock i, t1 represents a generation moment of the first frame of image, and t2 represents a generation moment of the second frame of image.

With reference to the first aspect, in another possible implementation of the first aspect, the performing super resolution processing on the second frame of image based on the at least one residual frame, the first alignment frame, and the second alignment frame to obtain a second frame of image obtained after super resolution includes: inputting the at least one residual frame to a neural network for feature extraction to obtain at least one first feature map; inputting the first alignment frame, the second alignment frame, and the second frame of image to the neural network for feature extraction to obtain at least one second feature map; inputting the at least one first feature map to a first super resolution network for processing to generate high-frequency information; inputting the at least one second feature map to a second super resolution network for processing to generate a luminance channel; and merging the high-frequency information with the luminance channel to generate the second frame of image obtained after super resolution.

In the implementation, at least one residual frame and at least one alignment frame are input to a same neural network for super resolution processing, thereby improving parameter utilization, decreasing a quantity of model parameters, and improving efficiency of super resolution processing.

With reference to the first aspect, in still another possible implementation of the first aspect, before the inputting the at least one residual frame to a neural network for feature extraction, the method further includes: determining a macroblock in a region of interest in the first residual frame, where the macroblock in the region of interest is a macroblock that is in a current macroblock and in which the sum of all pixel values exceeds a preset value; and determining a region of interest in a remaining residual frame other than the first residual frame in the at least one residual frame based on the macroblock in the region of interest in the first residual frame.

Correspondingly, the inputting the at least one residual frame to a neural network for feature extraction includes: inputting macroblocks in all regions of interest in the at least one residual frame to the neural network for feature extraction, where the at least one residual frame includes the first residual frame and the remaining residual frame.

In the implementation, each frame of image is divided into a region of interest and a non-region of interest, that is, a residual accumulation texture detail of each frame of image and motion features of a previous frame and a subsequent frame are analyzed. In addition, super resolution processing is performed on only a macroblock in the region of interest, and a super resolution processing result of the previous frame can be directly used for the non-region of interest, so as to avoid performing super resolution processing on the entire image. Therefore, a calculation amount is reduced, power consumption, a delay, and memory overheads are reduced, and efficiency of super resolution on a single frame of image is improved, thereby achieving a beneficial effect of obtaining a super resolution image in real time in short time.

With reference to the first aspect, in still another possible implementation of the first aspect, the inputting the first alignment frame, the second alignment frame, and the second frame of image to the neural network for feature extraction includes: inputting macroblocks in regions of interest in the first alignment frame and the second alignment frame, and the second frame of image to the neural network for feature extraction. The regions of interest in the first alignment frame and the second alignment frame each are the same as the region of interest in the first residual frame.

With reference to the first aspect, in still another possible implementation of the first aspect, the first frame of image, the second frame of image, and the third frame of image are three frames of images in a first group of pictures; or the first frame of image is a last frame of image in the first group of pictures, and the second frame of image and the third frame of image are the first two frames of images in a second group of pictures; or the first frame of image and the second frame of image are the last two frames of images in the first group of pictures, and the third frame of image is a first frame of image in the second group of pictures.

According to a second aspect, an embodiment of this application further provides an image processing apparatus. The apparatus includes a unit configured to perform the steps in the first aspect and the implementations of the first aspect. For example, the apparatus includes an obtaining unit, a processing unit, a sending unit, and the like, and may further include a storage unit.

Optionally, the apparatus is a communications apparatus or a chip.

Optionally, the apparatus may be integrated in a coder or a decoder, or may be in a video decoding system. In addition, the apparatus may be a source device or a destination device. A specific form of the image processing apparatus is not limited in this embodiment.

According to a third aspect, an embodiment of this application further provides an electronic device or an electronic apparatus, such as a video coding device. The device includes a processor, a transceiver, and a memory. The memory is coupled to the processor, and is configured to store computer program instructions necessary for the video coding device. When the processor invokes the computer program instructions stored in the memory, the device is enabled to perform the method in the first aspect and the implementations of the first aspect.

According to a fourth aspect, an embodiment of this application further provides a computer-readable storage medium. The storage medium stores instructions; and when the instructions are run on a computer or a processor, the method according to any one of the first aspect or the implementations of the first aspect is performed.

According to a fifth aspect, an embodiment of this application further provides a computer program product. The computer program product includes computer instructions; and when the instructions are executed by a computer or a processor, the method according to any one of the first aspect or the implementations of the first aspect can be implemented.

According to a sixth aspect, an embodiment of this application further provides a chip system. The chip system includes a processor and an interface circuit. The interface circuit is coupled to the processor. The processor is configured to execute a computer program or instructions, to implement the method according to any one of the first aspect or the implementations of the first aspect. The interface circuit is configured to communicate with another module outside the chip system.

According to the image processing method provided in the embodiments of this application, video frame alignment and residual accumulation calculation are performed by using motion vector information and residual information in a video codec process, and an alignment frame and an accumulated residual frame are used as inputs of a neural network module. Because high-frequency information is output after the accumulated residual frame passes through the neural network model, an edge detail can be enhanced by attaching the high-frequency information back to a luminance channel, thereby compensating for a problem in a super resolution process that image resolution is low because information about a high-frequency portion is missing from a low-resolution video frame. According to the method, video picture quality is improved without increasing hardware costs.

BRIEF DESCRIPTION OF DRAWINGS

FIG. 7A(1) and FIG. 7A(2) are a flowchart of another image processing method according to an embodiment of this application;

DESCRIPTION OF EMBODIMENTS

Figure 1:
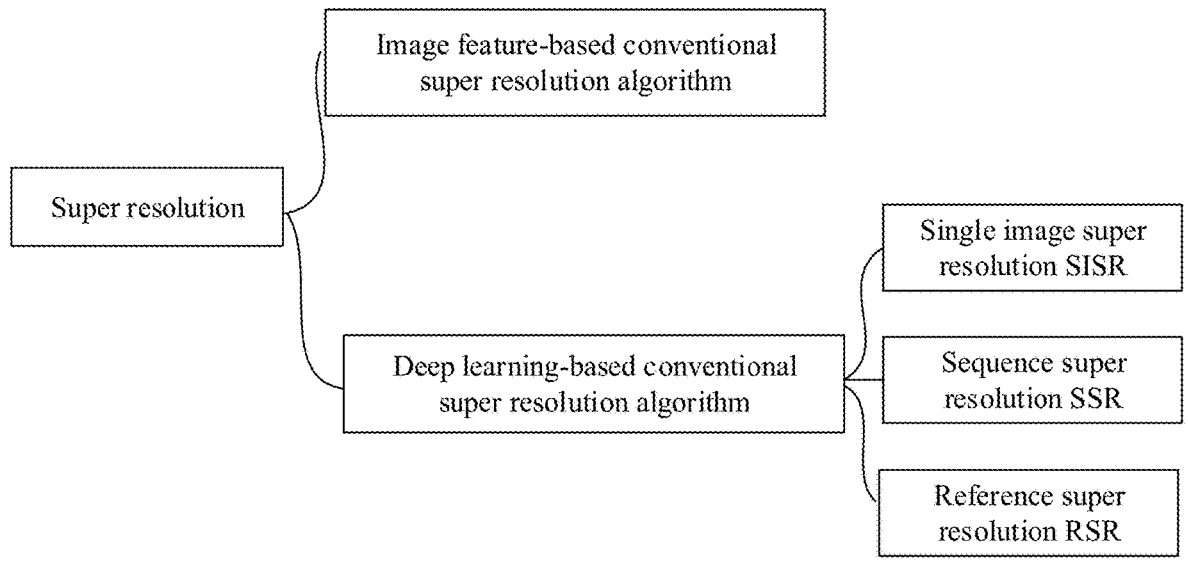
FIG. 1 is a schematic diagram of classification of super resolution algorithms according to this application.

To make a person skilled in the art understand the technical solutions in the embodiments of this application better, and make the objectives, features, and advantages of the embodiments of this application clearer, the following further describes the technical solutions in the embodiments of this application in detail with reference to the accompanying drawings.

Before the technical solutions of the embodiments of this application are described, technical scenarios and related technical terms of this application are first described with reference to the accompanying drawings.

The technical solutions of the embodiments are applied to the technical field of image processing, and are mainly used to perform super resolution processing on a series of consecutive frames of images in a video. The video may be understood as several frames of images (which may also be described as images in the art) played in a specific sequence at a specific frame rate. In a process of processing a video stream, video coding and video decoding are included.

Further, video coding is a process of performing a coding operation on each frame of image in a video to obtain coding information of the frame of image. Video coding is performed on a source side. Video decoding is a process of reconstructing each frame of image based on coding information of the frame of image. Video decoding is performed on a destination side. A combination of a video coding operation and a video decoding operation may be referred to as video codec (coding and decoding).

Existing video codec is performed based on a video codec standard (for example, a high efficiency video codec H.265 standard), and complies with a high efficiency video codec standard (high efficiency video coding standard, HEVC) test model. Alternatively, video codec is performed based on another proprietary or industry standard. For example, the standard includes ITU-TH.261, ISO/IECMPEG-1Visual, ITU-TH.262 or ISO/IECMPEG-2Visual, ITU-TH.263, ISO/IECMPEG-4Visual, ITU-TH.264 (or referred to as ISO/IECMPEG-4AVC), or the standard may further include scalable video codec and multi-view video codec extension. It should be understood that the technology of this application is not limited to any specific codec standard or technology.

Generally, a codec operation is in units of coding units (coding unit, CU). Specifically, in a coding process, an image is divided into a plurality of CUs, and then pixel data in these CUs is coded to obtain coding information of each CU. In a decoding process, an image is divided into a plurality of CUs, and then each CU is reconstructed based on coding information corresponding to the CU to obtain a reconstructed block of the CU. Alternatively, an image may be divided into grids including coding tree blocks. In some examples, the coding tree block is also referred to as a "tree block", a "largest coding unit" (largest coding unit, LCU), or a "coding tree unit". Optionally, the coding tree block may further continue to be divided into a plurality of CUs.

Figure 2A:
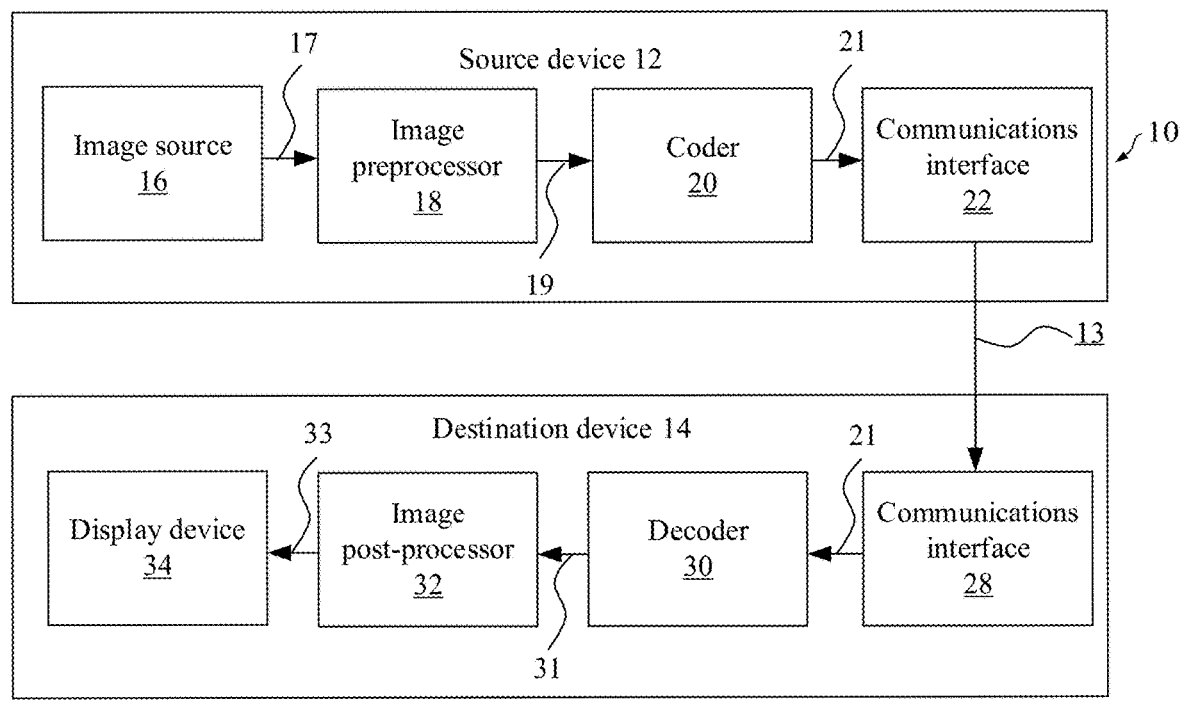
FIG. 2A is a schematic block diagram of a video codec system according to an embodiment of this application.

FIG. 2A illustrates a schematic block diagram of a video codec system 10 to which this application is applied. As shown in FIG. 2A, the system 10 includes a source device 12 and a destination device 14. The source device 12 generates coded video data, and therefore the source device 12 is also referred to as a video coding apparatus. The destination device 14 may decode the coded video data generated by the source device 12, and therefore the destination device 14 may be referred to as a video decoding apparatus.

The source device 12 and the destination device 14 each include one or more processors, and a memory coupled to the one or more processors. The memory includes but is not limited to a random access memory (random access memory, RAM), a read-only memory (read-only memory, ROM), an electrically erasable programmable read only memory (electrically erasable programmable read only memory, EEPROM), a flash memory, or any other medium that can be configured to store expected program code in a form of instructions or a data structure accessed by a computer.

The source device 12 and the destination device 14 each include various apparatuses, such as a desktop computer, a mobile computing apparatus, a notebook (such as laptop) computer, a tablet computer, a set-top box, a handheld phone such as a so-called "smart" phone, a television, a camera, a display apparatus, a digital media player, a video game console, an in-vehicle computer, a wireless communications device, an artificial intelligence device, a virtual reality/hybrid reality/augmented reality device, an automatic driving system, or another apparatus. A structure and a specific form of the foregoing apparatus are not limited in this embodiment of this application.

As shown in FIG. 2A, the source device 12 and the destination device 14 are connected through a link 13, and the destination device 14 receives the coded video data from the source device 12 through the link 13. The link 13 includes one or more media or apparatuses. In a possible implementation, the link 13 may include one or more communications media that enable the source device 12 to directly transmit the coded video data to the destination device 14 in real time. In an example, the source device 12 modulates video data based on a communications standard (for example, a wireless communications protocol), and transmits modulated video data to the destination device 14. The one or more communications media include a wireless or wired communications medium, such as a radio frequency (RF) spectrum or at least one physical transmission line. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an image source 16, an image preprocessor 18, a coder 20, and a communications interface 22. In a specific implementation, the coder 20, the image source 16, the image preprocessor 18, and the communications interface 22 may be hardware components in the source device 12, or may be software programs in the source device 12.

More specific descriptions are given below.

The image source 16 may include any type of image capturing device, and is configured to capture a real-word image or comment. The comment refers to some text on a screen when content on the screen is coded. The image capturing device is configured to obtain and/or provide a real-world image, a computer animation image, such as screen content, a virtual reality (virtual reality, VR) image, an augmented reality (augmented reality, AR) image, and the like. The picture source 16 may be a camera configured to capture a picture or a memory configured to store a picture. The picture source 16 may further include any type of (internal or external) interface through which a previously captured or generated picture is stored and/or a picture is obtained or received.

When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

An image stored in the image source 16 may be considered as a two-dimensional array or a matrix of pixels (picture element). The picture element in the array may also be referred to as a sample. A quantity of samples in horizontal and vertical directions (or axes) of the array or the picture defines a size and/or resolution of the picture. For representation of color, three color components are usually employed, to be specific, the picture may be represented as or include three sample arrays. For example, in an RBG form or color space, the image includes corresponding sample arrays: red (R), green (G), and blue (B). However, in video coding, each pixel is usually represented in a luminance/chrominance format or color space. For example, a picture in a YUV format includes a luminance component indicated by Y (sometimes indicated by L alternatively) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be transformed or converted into a YUV format and vice versa. This process is also referred to as color conversion or transformation. If a picture is monochrome, the picture may include only a luminance sample array. In this embodiment of this application, an image transmitted by the image source 16 to the image preprocessor 18 may also be referred to as original image data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The coder 20, or referred to as a video coder 20, is configured to receive preprocessed image data 19, and processes the preprocessed image data 19 in a prediction mode, to provide coded image data 21 (or referred to as a video stream). In some embodiments, the coder 20 may be configured to perform each embodiment of a video coding method described subsequently, to implement an image generation method described in this application.

The communications interface 22 may be configured to: receive the coded image data 21, and transmit the coded image data 21 to the destination device 14 through the link 13. The communications interface 22 may be, for example, configured to encapsulate the coded picture data 21 into an appropriate format, for example, a data packet, for transmission over the link 13.

The destination device 14 includes a communications interface 28, a decoder 30, an image post-processor 32, and a display device 34. The components or apparatuses included in the destination device 14 are described below one by one, and details are provided below.

The communications interface 28 is configured to receive the coded image data 21 from the source device 12. In addition, the communications interface 28 is further configured to receive the coded image data 21 through the link 13 between the source device 12 and the destination device 14. The link 13 is a direct wired or wireless connection, any type of network such as a wired or wireless network or any combination thereof, or any type of private network or public network or any combination thereof. The communications interface 28 may be, for example, configured to decapsulate the data packet transmitted through the communications interface 22, to obtain the coded picture data 21.

It should be noted that the communications interface 28 and the communications interface 22 each may be a unidirectional communications interface or a bidirectional communications interface, and may be configured to send and receive a message, and/or configured to establish a communications link, and transmit, through the link, for example, image data transmitted by using coded image data.

The decoder 30 (or referred to as a video decoder 30) is configured to receive the coded image data 21, and provide decoded image data 31 or a decoded image 31. In some embodiment, the decoder 30 may be configured to perform each embodiment of a video decoding method described subsequently, to implement the image generation method described in this application.

The image post-processor 32 is configured to perform post-processing on the decoded image data 31 to obtain post-processed image data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 for displaying the picture to a user or viewer. The display device 34 may be or include any type of display for presenting a reconstructed picture, for example, an integrated or external display or monitor. Further, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other display.

It should be understood that the source device 12 and the destination device 14 shown in FIG. 2A may be separate devices, or may be integrated into a same device, that is, the integrated device includes functions of both the source device 12 and the destination device 14. In a possible implementation, the source device 12 or the corresponding functionality and the destination device 14 or the corresponding functionality may be implemented by using same hardware and/or software, separate hardware and/or software, or any combination thereof.

In addition, it can be learned from the foregoing description that functional existence and (accurate) division of different units or the source device 12 and/or the destination device 14 shown in FIG. 2A may vary based on an actual device and application. The source device 12 and the destination device 14 each may include any of various devices, including any type of handheld or still device, such as a notebook or laptop computer, a mobile phone, a smartphone, a tablet or tablet computer, a camera, a desktop computer, a set-top box, a television, a camera, an in-vehicle device, a display device, a digital media player, a video game console, a video stream transmission device (such as a content service server or a content delivery server), a broadcast receiver device, a broadcast transmitter device, and the like. Specific structures and implementation forms of the source device 12 and the destination device 14 are not limited in this embodiment of this application.

The coder 20 and the decoder 30 each may be implemented as any of various suitable circuits, for example, one or more microprocessors, digital signal processors (digital signal processor, DSP), application-specific integrated circuits (application-specific integrated circuit, ASIC), field-programmable gate arrays (field-programmable gate array, FPGA), discrete logic, hardware, or any combination thereof. If the technology is partially implemented by using software, the device may store instructions of the software in a proper computer-readable storage medium, and may use one or more processors to execute computer program instructions to perform the image generation method described in this application.

In an example, the video coding and decoding system 10 shown in FIG. 2A is merely used as an example, and the technical solution of this embodiment of this application is applicable to a video coding setting, such as video coding or video decoding, that does not need to include any data communication between a coding device and decoding device. In other examples, data may be retrieved from a local memory, streamed over a network, or the like. The video coding device may code data and store the data into a memory, and/or the video decoding device may retrieve the data from the memory and decode the data.

Figure 2B:
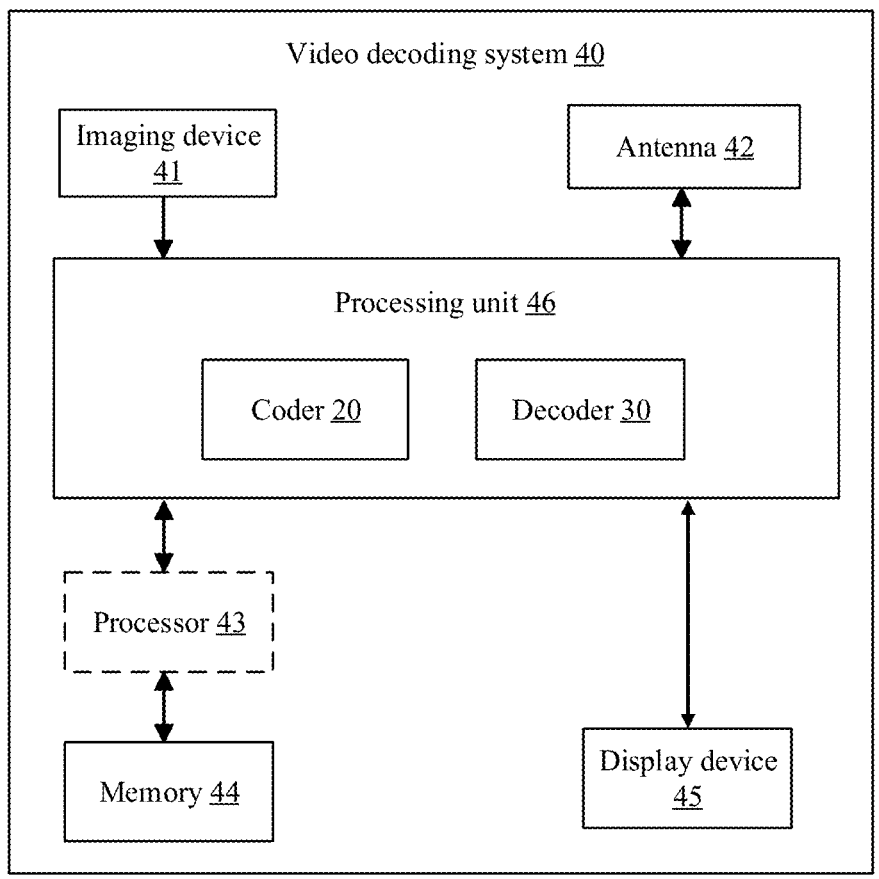
FIG. 2B is a schematic diagram of an example structure of a video decoding system according to an embodiment of this application.

FIG. 2B is a schematic diagram of a structure of a video decoding system 40 including a coder 20 and a decoder 30 according to an example embodiment. The video decoding system 40 may implement various method steps in the embodiments of this application. In the various embodiments, the video decoding system 40 may include an imaging device 41, a coder 20, a decoder 30 (and/or a video coder/decoder implemented by using a processing unit 46), an antenna 42, a processor 43, a memory 44, and a display device 45.

As shown in FIG. 2B, the imaging device 41, the antenna 42, the processing unit 46, the coder 20, the decoder 30, the processor 43, the memory 44, and/or the display device 45 can communicate with each other. In addition, the processing unit 46 may include only the coder 20 or include only the decoder 30.

In an example, the antenna 42 is configured to transmit or receive a video stream or a coded bitstream of video data. In addition, the display device 45 may be further configured to present video data. In an implementation, the processing unit 46 may include application-specific integrated circuit (application-specific integrated circuit, ASIC) logic, a graphics processing unit, a general-purpose processor, and the like. The video decoding system 40 may also include the processor 43. The processor 43 may similarly include ASIC logic, a graphics processor, a general-purpose processor, and the like. Further, the processing unit 46 may be implemented by using hardware, such as video coding-specific hardware.

The processor 43 may be implemented by using general-purpose software, an operating system, and the like.

The memory 44 may be any type of memory, for example, a volatile memory such as a static random access memory (Static Random Access Memory, SRAM) or a dynamic random access memory (Dynamic Random Access Memory, DRAM), or a nonvolatile memory (such as a flash memory). The processing unit 46 may access the memory 44, for example, the memory 44 is configured to implement an image buffer. In addition, the processing unit 46 may further include a memory, for example, a cache.

In an implementation, the coder 20 implemented by using a logic circuit includes an image buffer and a graphics processing unit. The image buffer may be implemented by using the processing unit 46 or the memory 44, and the graphics processing unit may be implemented by using the processing unit 46. In addition, in a possible case, the graphics processing unit is coupled to the image buffer. In an example, the graphics processing unit includes the coder 20 implemented by using the processing unit 46.

The decoder 30 may be implemented in a similar manner by using the processing unit 46. In an example, the decoder 30 includes an image buffer and a graphics processing unit. The graphics processing unit may be coupled to the image buffer. In an example, the graphics processing unit includes the decoder 30 implemented by using the processing unit 46.

The antenna 42 is configured to receive a video stream of a coded bitstream of video data. Specifically, the coded bitstream includes data, an indicator, an index value, mode selection data, and the like that are related to a coded video frame, for example, data related to coding segmentation, such as a transform coefficient or a quantized transform coefficient, an optional indicator, and/or data that defines coding segmentation. The video decoding system 40 may further include the decoder 30 that is coupled to the antenna 42 and that is configured to decode the coded bitstream. The display device 45 is configured to display an image frame.

It should be understood that for the description of the function of the coder 20 in this embodiment of this application, the decoder 30 may be configured to perform a function opposite to that of the coder 20. The decoder 30 may be configured to receive and decode related video data. It should be noted that a decoding method described in the embodiments of this application is mainly used in a decoding process, and this process exists on both the coder 20 and the decoder 30.

Figure 3A:
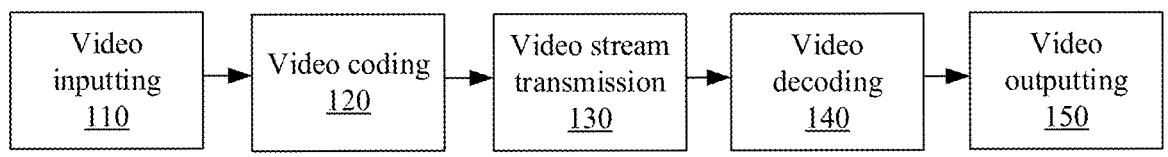
FIG. 3A is a schematic flowchart of a video codec method according to an embodiment of this application.

FIG. 3A is a schematic flowchart of a video codec method according to an embodiment of this application, and the method may be applied to the systems shown in FIGS. 2A and 2B. Specifically, the method may be summarized as the following five steps: video inputting 110, video coding 120, video stream transmission 130, video decoding 140, and video outputting 150.

In the step of "video inputting 110", a lossless video or image collected by a collection device such as a camera is input to a coder. In the step of "video coding 120", the obtained video or image is compressed and coded by using an H.264 or H.265 codec to generate a coded video stream. Then in the step of "video stream transmission 130", the video stream is uploaded to a cloud server, and a user downloads the video stream from the cloud server. The step of "video decoding 140" includes a process in which a terminal device decodes, by using a decoder, the video stream downloaded from the cloud. Finally, a decoded video image is output and displayed in the step of "video outputting 150".

Figure 3B:
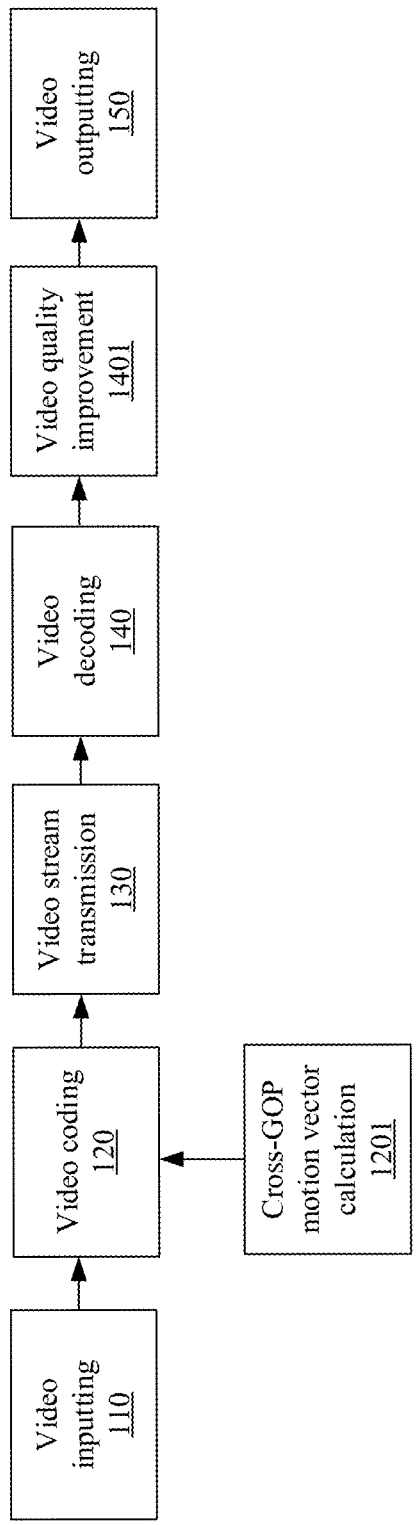
FIG. 3B is a schematic flowchart of another video codec method according to an embodiment of this application.

Further, as shown in FIG. 3B, the codec process shown in FIG. 3A further includes steps of "cross-GOP motion vector calculation 1201" and "video quality improvement 1401". The cross-GOP motion vector calculation refers to calculation of a motion vector between two neighboring GOPs. Step 1201 of cross-GOP motion vector calculation mainly functions in a process in video coding 120. A video quality improvement process in step 1401 mainly functions after video decoding 140 and before video outputting 150. Specifically, implementation processes of the two steps are described in detail in a subsequent embodiment.

Optionally, the steps of "cross-GOP motion vector calculation 1201" and "video quality improvement 1401" may be implemented by using program code or by using a corresponding neural network model. For example, the steps 1201 and 1401 are implemented by using a newly added unit module or by using an existing processing unit (including a coder and a decoder).

Figure 4A:
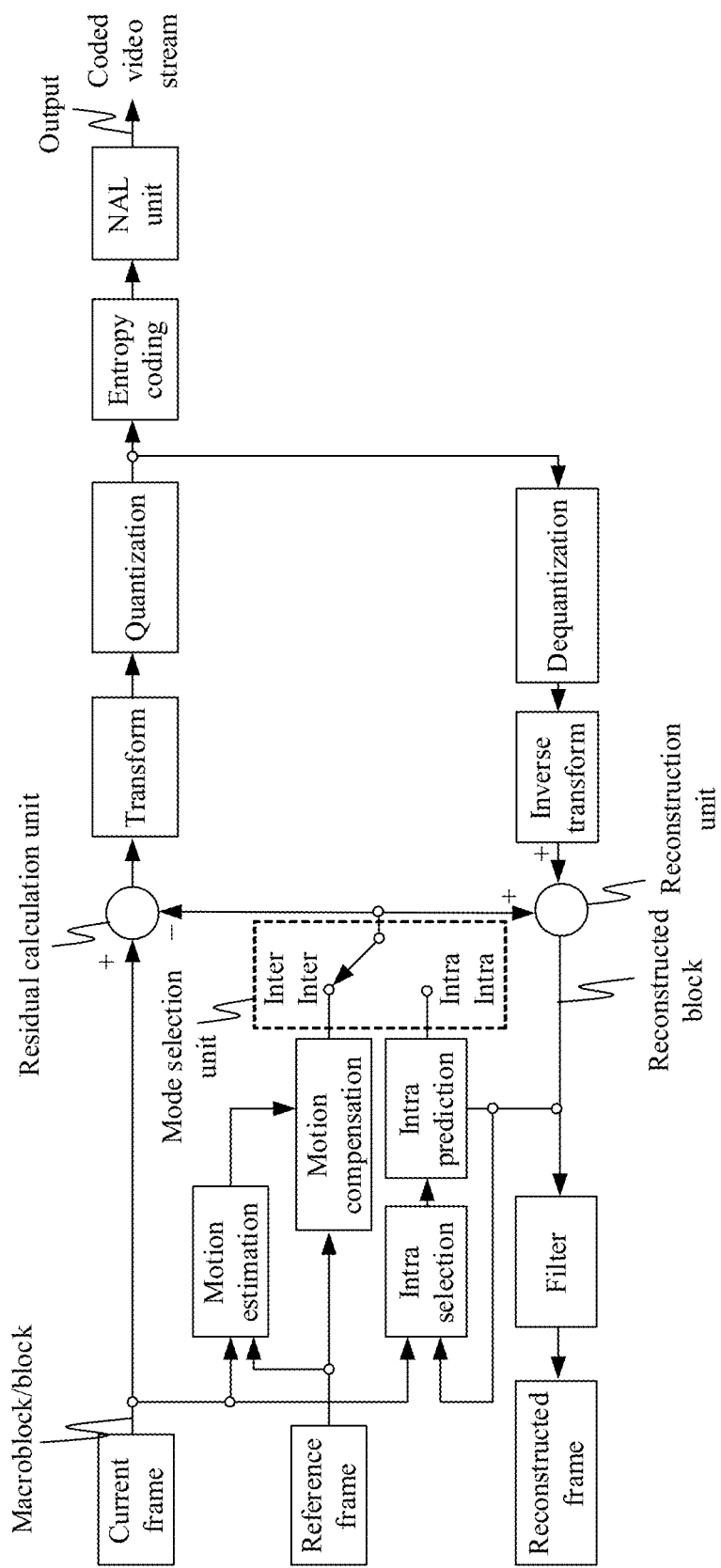
FIG. 4A is a schematic diagram of an example structure of a coder 20 according to an embodiment of this application.

A codec structure principle of a video coding layer (video coding layer, VCL) in a video codec standard H.264 is briefly described below. FIG. 4A is a schematic diagram of a structure of a coder 20. Specifically, an execution function of the coder 20 includes two paths, one is a forward path and the other is a reconstruction path. In the forward path, the coder performs intra (Intra) or inter (Inter) coding processing on an input frame in units of macroblocks or sub-blocks. If intra coding is performed, a prediction value of intra coding is obtained through prediction by using a pixel in a current image. Alternatively, if inter coding is performed, a prediction value of inter coding is obtained through motion compensation of a reference image. The reference image may be selected from a coded, decoded, reconstructed, and filtered frame in the past or future (in terms of display sequence).

After the prediction value is subtracted from a current block, a residual block is generated. After the residual block is transformed and quantized, a quantized transform coefficient is generated; then entropy coding is performed on the residual block; the residual block forms a compressed video stream together with some side information (such as a prediction mode, a quantization parameter, and motion vector information) required for decoding; and finally the residual block is delivered to a network abstraction layer (network abstraction layer, NAL) for transmission and storage.

In the reconstruction path, to provide a reference image for prediction, a coder needs to have an image reconstruction function. Therefore, dequantization processing needs to be performed on an image whose coefficient is transformed, and a residual obtained after inverse transform and the prediction value are added to obtain an unfiltered image (a reconstructed block). Finally, the reconstructed block is filtered by a filter to obtain a reconstructed reference image, that is, a reconstructed frame.

Figure 4B:
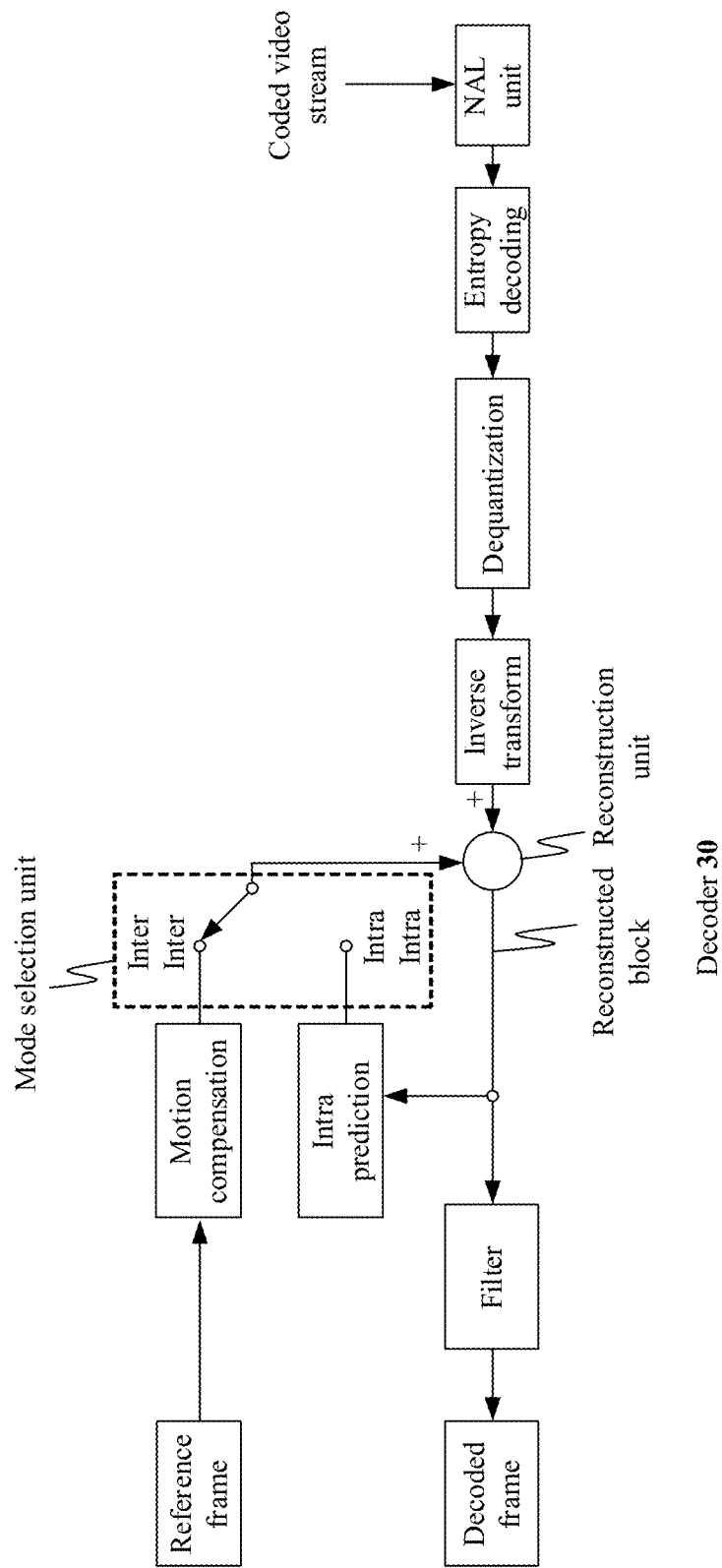
FIG. 4B is a schematic diagram of an example structure of a decoder 30 according to an embodiment of this application.

FIG. 4B is a schematic diagram of a structure of a decoder 30. The decoder 30 receives a video stream from a NAL unit. A transform coefficient is obtained after entropy decoding is performed on the video stream, and then a residual is obtained after dequantization and inverse transform are performed on an image obtained after entropy decoding. Head information is obtained by decoding the stream, and the decoder generates a prediction value. The prediction value and the residual are added, and then a decoded image is obtained after filtering is performed on a result obtained after the addition.

During coding, a video frame is divided into two coding modes: intra (intra) coding and inter (inter) coding. First, each video frame is divided into blocks (or referred to as macroblocks), so that processing of the frame is performed at a block level. Then, a pixel in a block is predicted by using spatial redundancy existing in the video frame and a neighboring pixel, to transform a video block between different domains. The video block is transformed from a time domain to another domain, so that transform coefficients concentrate on a few points. Alternatively, a video block matching a current block is found in a reference frame through motion vector estimation by using temporal redundancy existing between consecutive video frames, and then a difference between the two blocks is calculated, and the difference is transformed. Finally, entropy coding is performed on a transform coefficient and a motion vector.

This embodiment is mainly applied to codec during inter prediction, and inter prediction and various technologies of inter prediction are described below.

In inter prediction and coding, time-domain redundant information of a video signal is eliminated through motion estimation and compensation by using time-domain correlation of a video signal, to compress video data. Because time-domain correlation of the video signal is much larger than space-domain correlation of the video signal, a coded code stream can be greatly reduced through inter prediction and coding.

In inter coding, a group of frames or a group of pictures (Group of pictures, GOP) mainly includes two frame modes: an I frame (Intra Frame) and a P frame (Predict Frame). Motion estimation uses a positive-pixel motion vector. The I frame is also referred to as a key frame, and only performs intra-frame macroblock prediction and coding, so that more information can be retained. The P frame is also referred to as a predict frame. Further, the P frame is a forward predict frame, which can be understood as that the P frame needs to perform inter-frame macroblock motion estimation by using a previous frame, and calculate a motion vector.

Various technologies of inter coding are described below.
(1) Block Division

When motion estimation is performed, a size of a used block has a relatively large impact on an effect of motion estimation. Therefore, using a relatively small block can make a motion estimation result more accurate, thereby generating a relatively small residual and reducing a bit rate. Different macroblock segmentation manners are used when motion estimation is performed in H.264. For example, a 16×16 macroblock may be divided into blocks with the following several sizes: one 16×16 block, two 16×8 blocks or 8×16 blocks, or four 8×8 blocks. An 8×8 block may be further divided into one 8×8 block, two 8×4 blocks or 4×8 blocks, or four 4×4 blocks. A chrominance component of the macroblock uses a segmentation mode the same as a luminance block, but a size is halved in horizontal and vertical directions.

Each block has a motion vector MV, each MV is coded and transmitted, and segmentation selection is also coded and compressed into a bitstream. For a large segmentation size, MV selection and a segmentation type require only a few bits, but a motion compensation residual has high energy in a multi-detail region. For a small segmentation size, the motion compensation residual has low energy, but more bits are required to represent MV and segmentation selection. Therefore, as a whole, the large segmentation size is suitable for a flat region, and the small segmentation size is suitable for a multi-detail region.

(2) Motion Vector MV Prediction

H. 264 supports various types of segmentation for a macroblock and a sub-macroblock. Therefore, if an image has relatively more details, a block obtained through division has a relatively small size; and if an MV of each block is independently coded, a considerable quantity of bits are required. Because an MV of a block has a relatively strong correlation with a neighboring block, the MV may be obtained through prediction by using a neighboring coded segmented block. To be specific, a difference between a motion vector prediction (MV Predict, MVP) value of the neighboring coded segmented block and the MV of the current macroblock may be obtained by using the motion vector prediction value and the MV, and the difference is coded and transmitted.

The following describes in detail the technical solutions in the embodiments of this application.

The technical solutions provided in the embodiments of this application may be applied to a scenario of a real-time video service, for example, a video is displayed on a mobile terminal and a large-screen device, and video quality is improved by using a joint video codec technology, so that a video frame has high resolution and a low negative effect.

Embodiment 1

In the technical solution of this embodiment of this application, based on motion vectors that are of blocks (or macroblocks) and that are obtained by a decoder, pixel alignment is directly performed on a plurality of consecutive video frames based on the motion vectors to obtain an alignment frame, a residual between the video frames is obtained to obtain a residual frame, and the alignment frame and the residual frame are sent to a neural network, to perform super resolution processing on a to-be-processed image to obtain a video frame after super resolution.

Figure 5:
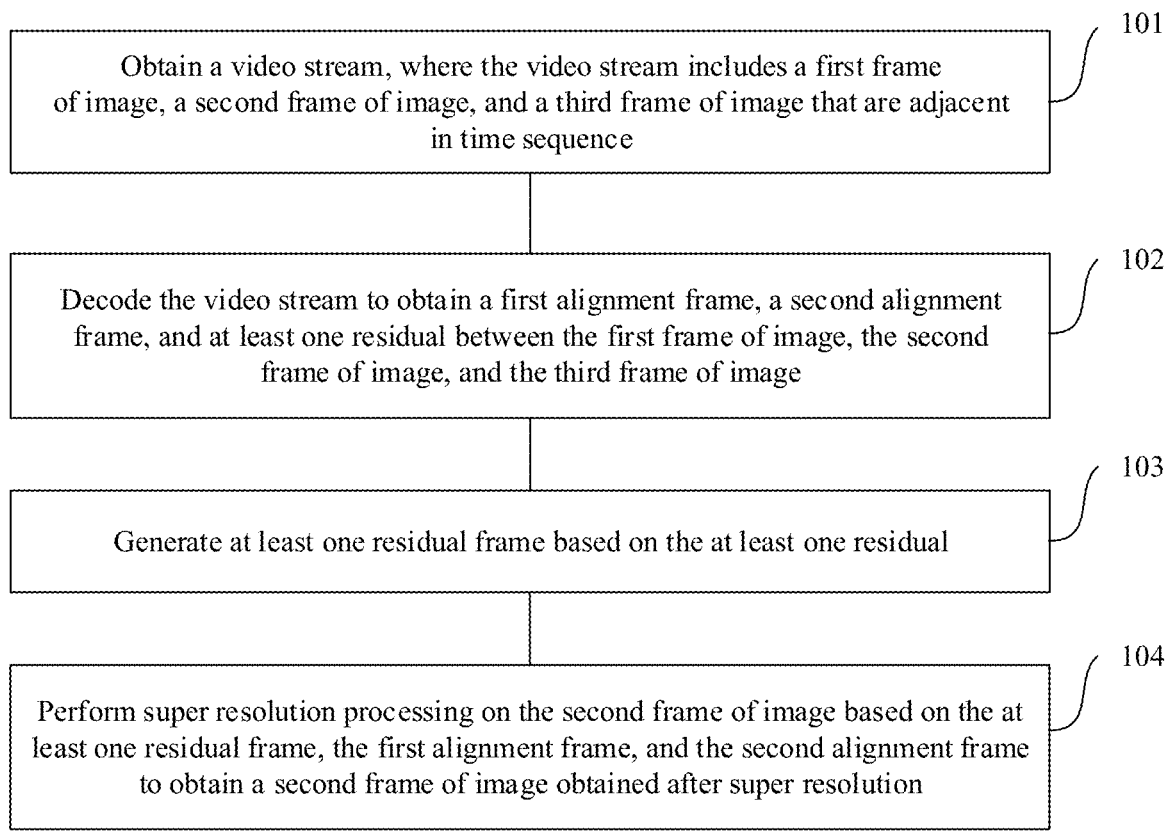
FIG. 5 is a flowchart of an image processing method according to an embodiment of this application.

Specifically, as shown in FIG. 5, this embodiment provides an image processing method. The method may be applied to the decoder 30, and the method includes the following steps.

Step 101: Obtain a video stream, where the video stream includes a first frame of image, a second frame of image, and a third frame of image that are adjacent in time sequence.

The video stream is a code stream or a bitstream that is output after an input video is coded and compressed by a coder, and the video stream includes two or more frames of images. "Adjacent in time sequence" means that the frames are continuously photographed (or generated) in terms of time.

In an example, in a coding phase, the coder divides the video stream into at least one group of pictures (group of pictures, GOP), and each GOP includes an I frame and subsequent several P frames. For example, the video stream includes a first GOP and a second GOP, where the first GOP includes one I frame and three P frames, that is, {I1, P1, P2, P3}, and the second GOP also includes one I frame and three P frames, that is, {I2, P4, P5, P6}. Therefore, frames included in the video stream include I1, P1, P2, P3, I2, P4, P5, and P6.

Step 102: Decode the video stream to obtain a first alignment frame, a second alignment frame, and at least one residual between the first frame of image, the second frame of image, and the third frame of image.

A decoder receives the video stream transmitted from the coder, and decodes the video stream to obtain video information. The video information includes all frames of images forming the video stream, and a motion vector and a residual that are of each of two neighboring frames.

In this embodiment, that super resolution is performed on the second frame of image is used as an example. After the video stream is parsed, a first motion vector, a second motion vector, the first alignment frame, the second alignment frame, and the at least one residual are obtained. Specifically, the first alignment frame is generated after the first frame of image moves a pixel block towards the second frame of image based on the first motion vector, and the second alignment frame is generated after the third frame of image moves a pixel block towards the second frame of image based on the second motion vector.

For example, in the first GOP of the video stream, the first frame of image is I1, the second frame of image is P1, and the third frame of image is P2. A process of generating the first alignment frame and the second alignment frame by using the second frame of image P1 as a target frame (P1 is a frame on which super resolution is performed) includes the following: A same location in the first frame of image I1 and the second frame of image P1 is divided into a plurality of macroblocks in advance, for example, nine 3×3 macroblocks are obtained through division. Each macroblock includes a plurality of pixels, and each pixel corresponds to a pixel value. Relative displacement between a pixel value of a first macroblock in the I1 frame and a macroblock that is in the target frame P1 and that best matches the first macroblock is a motion vector of the first macroblock in the I1 frame, and the motion vector may be represented as $MV_{11}$. The P1 frame is searched for macroblocks that respectively match the nine macroblocks in the I1 frame, and then nine motion vectors of the I1 frame can be obtained. The nine motion vectors are collectively referred to as the "first motion vector", and may be represented by a matrix MV1, for example:

the first motion vector is $$MV1 = \begin{bmatrix} MV_{11} & MV_{12} & MV_{13} \\ MV_{21} & MV_{22} & MV_{23} \\ MV_{31} & MV_{32} & MV_{33} \end{bmatrix}.$$

In a possible case, if the target frame P1 has no macroblock that matches a specific macroblock in the I1 frame, a motion vector of the macroblock is (0, 0), indicating that the macroblock does not move, and a matched location is an original location of the macroblock. An image formed after a pixel block in each macroblock in the first frame of image I1 moves based on the first motion vector MV1 is the first alignment frame. For a specific process, refer to related description of "image motion compensation and alignment" in the standard. Details are not described herein in this embodiment.

Similarly, the second alignment frame is generated after the third frame of image P2 moves a pixel block towards the target frame P1 based on the second motion vector MV2. A specific implementation process is similar to the process of generating the first alignment frame, and details are not described again.

The residual is a pixel difference between each macroblock in a previous frame of image and each macroblock in a subsequent of image after the previous frame of image performs motion compensation towards the subsequent frame of image based on a motion vector. Specifically, a residual (also referred to as a first residual) between the first frame of image I1 and the second frame of image P1 may be defined as a pixel difference between each macroblock in the second frame of image P1 and each macroblock in the first alignment frame obtained after the first frame of image I1 performs motion compensation and alignment towards the second frame of image P1 based on the first motion vector MV1. If the first alignment frame includes nine 3×3 macroblocks, nine pixel differences may be generated between the nine 3×3 macroblocks and the nine blocks in the second frame of image P1, and each pixel difference may be represented as $\Delta_1^{(t)}$. For example, the first frame of image I1 is generated at a moment t1, and the second frame of image P1 is generated at a moment t2. In this case, $\Delta_i^{(t2)}$ represents a residual between a first macroblock in the first alignment frame and a first macroblock in the P1 frame. It can be understood that the first residual may be represented by a matrix, for example:

the first residual is $$\Delta_i^{(t2)} = \begin{bmatrix} \Delta_1 & \Delta_2 & \Delta_3 \\ \Delta_4 & \Delta_5 & \Delta_6 \\ \Delta_7 & \Delta_8 & \Delta_9 \end{bmatrix},$$

where i is a positive integer, and $1 \leq i \leq 9$.

Similarly, the method further includes: obtaining a second residual. The second residual is a pixel difference between each macroblock in the second alignment frame and each macroblock in the second frame of image P2, and the second alignment frame is generated after the second frame of image P1 performs motion compensation and alignment towards to the third frame of image P2 based on the second motion vector MV2. For example, when the third frame of image P2 is generated at a moment t3, the second residual is represented as $\Delta_i^{(t3)}$.

In addition, the method further includes: obtaining a residual of the first frame of image P1. Because the first frame of image P1 is the first frame in the entire video stream, there is no frame of image previous to the first frame of image P1, and the residual of the first frame of image of P1 is 0.

Therefore, the obtaining at least one residual between the first frame of image I1, the second frame of image P1, and the third frame of image P2 by using step 102 includes: obtaining the first residual $\Delta_i^{(t2)}$ and the second residual $\Delta_i^{(t3)}$.

Step 103: Generate at least one residual frame based on the at least one residual.

Specifically, step 103 includes:

generating a first residual frame based on the first residual $\Delta_i^{(t2)}$, and generating a second residual frame based on the first residual $\Delta_i^{(t2)}$ and the second residual $\Delta_i^{(t3)}$.

The first residual and the first alignment frame satisfy the following relationship:

$$I_i^{(t2)} = I_{i-T_i^{(t2)}}^{(t1)} + \Delta_i^{(t2)}, \qquad \text{(Formula 1)}$$

where $I_i^{(t2)}$ represents the second frame of image P1, $$I^{(t1)}_{i-T^{(t2)}_i}$$

represents the first alignment frame, $\Delta_i^{(t2)}$ represents the first residual, i represents a macroblock in the first frame of image, $\Delta_i^{(t2)}$ represents a macroblock obtained after the macroblock i moves based on a motion vector $T_i^{(t2)}$ corresponding to the macroblock i, t1 represents the generation moment of the first frame of image I1, and t2 represents the generation moment of the second frame of image P1.

A pixel value (RGB value) that is of each macroblock and that is represented by the first residual $\Delta_i^{(t2)}$ is restored to obtain the first residual frame.

Similarly, the second residual and the second alignment frame satisfy the following relationship:

$$I_i^{(t3)} = I^{(t2)}_{i-T^{(t3)}_i} + \Delta_i^{(t3)}, \qquad \text{(Formula 2)}$$

where $I_i^{(t3)}$ represents the third frame of image P2, $$I^{(t2)}_{i-T^{(t3)}_i}$$

represents the second alignment frame, $\Delta_i^{(t3)}$ represents the second residual, i represents a macroblock in the second frame of image, $i-T_i^{(t3)}$ represents a macroblock obtained after the macroblock moves based on a motion vector $T_i^{(t3)}$ corresponding to the macroblock i, and t3 represents the generation moment of the third frame of image P2.

A correspondence that is between the third frame of image P2 and the first frame of image I1 and that is obtained by substituting Formula 2 into Formula 1 is:

$$I_i^{(t3)} = I^{(t1)}_{i-T^{(t2)}_i-T^{(t3)}_i} + \Delta_i^{(t2)} + \Delta_i^{(t3)}, \qquad \text{(Formula 3)}$$

where $\Delta_i^{(t2)}+\Delta_i^{(t3)}$ is an accumulated residual between the first frame of image I1 and the third frame of image P2, that is, the accumulated residual is the sum of the first residual $\Delta_i^{(t2)}$ and the second residual $\Delta_i^{(t3)}$.

The generating a second residual frame based on the first residual $\Delta_i^{(t2)}$ and the second residual $\Delta_i^{(t3)}$ includes: performing restoration based on a pixel value (RGB value) that is of each macroblock and that is represented by the accumulated residual $\Delta_i^{(t2)}+\Delta_i^{(t3)}$, to obtain the second residual frame.

In this embodiment, the correspondence between the first frame of image and the third frame of image is obtained by using Formula 1 and Formula 2, that is, for the two frames spaced apart, the third frame of image P2 is expressed by using the key frame I1.

It should be understood that based on the correspondence in Formula 1, if a fourth frame of image P3, a fifth frame of image P4, or the like are further included, a correspondence between the frame and the key frame I1 can be obtained by using an accumulation relationship. To be specific, an accumulated residual and an expression that is for the fourth frame of image P3 or the fifth frame of image P4 and the key frame I1 are obtained through variation of Formula 1 and Formula 2.

Step 104: Perform super resolution processing on the second frame of image based on the at least one residual frame, the first alignment frame, and the second alignment frame to obtain a second frame of image obtained after super resolution.

Figure 6:
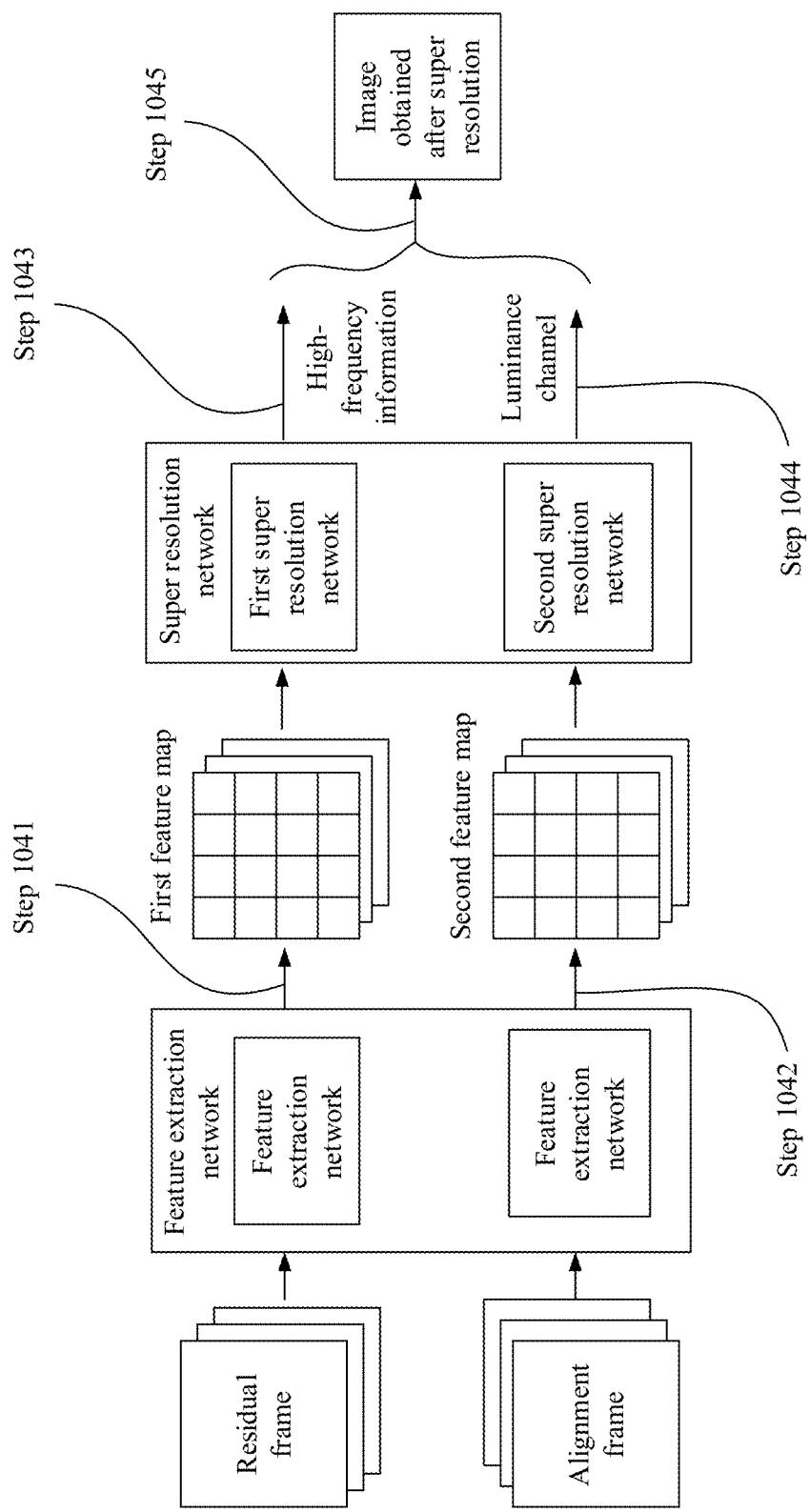
FIG. 6 is a flowchart of performing processing by using a neural network and generating a super resolution image according to an embodiment of this application.

Specifically, as shown in FIG. 6, step 104 includes the following steps.

Step 1041: Input the at least one residual frame to a neural network for feature extraction to obtain at least one first feature map.

The neural network includes a plurality of levels with different functions. Functions of each of the plurality of levels include but are not limited to convolution, pooling, activation, and another operation. Feature extraction, analysis, and integration may be performed on input image data through processing at these levels, to finally output an image obtained after super resolution.

In an example, the first residual frame and the second residual frame are input to the neural network. The first residual frame is generated by using the first residual $\Delta_i^{(t2)}$, and the second residual frame is generated by using the first residual $\Delta_i^{(t2)}$ and the second residual $\Delta_i^{(t2)}$ (that is, by using the accumulated residual $\Delta_i^{(t2)}+\Delta_i^{(t3)}$.

Optionally, in an implementation, the neural network may include a feature extraction network and a super resolution network, and the super resolution network includes a first super resolution network and a second super resolution network. As shown in FIG. 6, step 1041 specifically includes: inputting the first residual frame and the second residual frame to the feature extraction network to obtain at least one first feature map.

Step 1042: Input the first alignment frame, the second alignment frame, and the second frame of image to the neural network for feature extraction to obtain at least one second feature map.

Optionally, in an implementation, the first alignment frame, the second alignment frame, and the second frame of image are input to the feature extraction network for feature extraction to obtain at least one second feature map.

Step 1043: Input the at least one first feature map to the first super resolution network for processing to generate high-frequency information.

Step 1044: Input the at least one second feature map to the second super resolution network for processing to generate a luminance channel.

The first super resolution network is different from the second super resolution network. For example, the two super resolution networks have different network structures, complexity degrees, and weight parameters.

Step 1045: Merge the high-frequency information with the luminance channel to generate the second frame of image obtained after super resolution.

In this embodiment, at least one residual frame and at least one alignment frame are input to a same neural network for super resolution processing, thereby improving parameter utilization, decreasing a quantity of model parameters, and improving efficiency of super resolution processing.

According to the joint video codec solution provided in this embodiment of this application, video frame alignment and residual accumulation are performed by using motion vector information and residual information in a video codec process, and the alignment frame and the residual frame are used as inputs of the neural network. Because high-frequency information is output after an accumulated frame passes through the neural network, an edge detail can be enhanced by attaching the high-frequency information back to the luminance channel, thereby compensating for a problem in a super resolution process that image resolution is low because information about a high-frequency portion is missing from a low-resolution video frame.

In addition, in a possible implementation, before the at least one residual frame and the at least one alignment frame are sent to the neural network for super resolution processing in step 104, the method further includes the following:

The at least one residual frame and the at least one alignment frame each are divided to obtain a region of interest, and the region of interest is a macroblock that is in the residual frame or the alignment frame and on which super resolution processing needs to be performed. Further, the region of interest may be determined by comparing a preset value with a pixel value of a macroblock obtained through division in the residual frame or the alignment frame.

For example, the first residual frame is used as an example. A macroblock in a region of interest in the first residual frame is determined, and the macroblock in the region of interest is a macroblock that is included in a current macroblock and in which the sum of all pixel values exceeds a first preset value. To be specific, the first residual frame is divided into a plurality of macroblocks, for example, nine 3×3 macroblocks are obtained through division. The sum of all pixels in each macroblock is calculated, the sum of the pixels in each macroblock is compared with the first preset value, and all macroblocks in which the sum of pixels is greater than or equal to the first preset value are selected as regions of interest, and super resolution processing is performed on these regions.

Correspondingly, a macroblock in which the sum of pixels is less than the first preset value is set as a non-region of interest. A macroblock in the non-region of interest is a low-texture region. Therefore, a super resolution processing result of a previous frame can be directly used for this region without performing super resolution processing on this region again, thereby reducing a calculation amount and improving efficiency of super resolution processing.

In addition, in this embodiment, the method further includes: dividing each residual frame (such as the second residual frame) other than the first residual frame to obtain a region of interest.

Specifically, in a possible implementation, the same as the method for dividing the first residual frame to obtain a region of interest, a pixel value of each macroblock is compared with the first preset value to determine whether the macroblock is a region of interest. A detailed determining process is similar to the process of determining a region of interest in the first residual frame, and details are not described herein again.

In another possible implementation, a macroblock at a location the same as that of the region of interest determined in the first residual frame is used as the region of interest in the second residual frame. For example, when it is determined that macroblocks in the region of interest in the first residual frame are macroblocks 4 to 8 (there are nine macroblocks in total), correspondingly, it is determined that macroblocks in the region of interest in the second residual frame are also macroblocks 4 to 8.

In another possible implementation, the region of interest determined in the first residual frame may be the same as a region in the alignment frame. To be specific, the at least one alignment frame is divided into a region of interest and a non-region of interest, and then a region of interest determined in the alignment frame is used as the region of interest in the first residual frame.

Specifically, the dividing the at least one alignment frame to obtain a region of interest includes the following: In a possible division manner, a pixel value of each macroblock in the first alignment frame is compared with a second preset value, all macroblocks whose pixel values each are greater than or equal to the second preset value are set as regions of interest, and a macroblock whose pixel value is smaller than the second preset value is set as a non-region of interest. Similarly, the region of interest determined in the second alignment frame may be the same as the region of interest in the first alignment frame.

After regions of interest in all residual frames and all alignment frames are determined, macroblocks in all the regions of interest are input to the neural network for feature extraction, and for a macroblock in a remaining non-region of interest, a super resolution result of a previous frame of image can be used. Then the super resolution result is combined with a super resolution result obtained through super resolution processing currently perform on the regions of interest, to finally obtain, through merging, an image obtain after super resolution.

In this embodiment, each frame of image is divided into a region of interest and a non-region of interest, that is, a residual accumulation texture detail of each frame of image and motion features of a previous frame and a subsequent frame are analyzed. In addition, super resolution processing is performed on only a macroblock in the region of interest, and a super resolution processing result of the previous frame can be directly used for the non-region of interest, so as to avoid performing super resolution processing on the entire image. Therefore, a calculation amount is reduced, power consumption, a delay, and memory overheads are reduced, and efficiency of super resolution on a single frame of image is improved, thereby achieving a beneficial effect of obtaining a super resolution image in real time in short time.

It should be noted that the first three frames of images in a GOP are enumerated in the foregoing embodiment. The frames include but are not limited to the three frames of images, and may be other frames of images, or may be located in different GOPs. For example, in a possible case, the first frame of image is a last frame of image in the first GOP, and the second frame of image and the third frame of image are the first two frames of images in the second GOP. In another possible case, the first frame of image and the second frame of image are the last two frames of images in the first GOP, and the third frame of image is a first frame of image in the second GOP. The first GOP and the second GOP are adjacent in time sequence. In addition, a target frame on which super resolution is to be performed may be any of the first frame of image, the second frame of image, and the third frame of image. This is not limited in this embodiment.

Embodiment 2

The image processing method provided in this application is described below by using an example in which the first frame of image is the last frame in the first GOP, and the second frame of image and the third frame of image are the first two frames in the second GOP. The method is applied to the decoder 30, the video decoding system 40, or the destination device 14 described in the foregoing embodiments.

Further, as shown in FIG. 7A(1) and FIG. 7A(2), the method includes the following steps.

Step 701: Obtain a video source. The video source may be from a short video or a video call APP platform, the short video or a video stream may be downloaded and obtained from a cloud.

Step 702: A coder codes the video source to generate a video stream.

In an example, in a coding phase, the coder divides the video stream into two GOPs: a first GOP and a second GOP, where the first GOP includes one I frame and three P frames, that is, {I1, P1, P2, P3}, and the second GOP also includes one I frame and three P frames, that is, {I2, P4, P5, P6}. Therefore, frames included in the video stream include I1, P1, P2, P3, I2, P4, P5, and P6. Any of these frames is selected as a target frame, and super resolution is performed on the target frame.

In step 702, the video coding phase further includes step 7021: The coder obtains a cross-GOP motion vector, and performs inter prediction based on the cross-GOP motion vector.

The "cross-GOP motion vector" refers to a motion vector between a last frame of image in a previous GOP and a first frame of image in a subsequent GOP. For example, a cross-GOP motion vector between the first GOP and the second GOP refers to a motion vector between the P3 frame in the first GOP and the I2 frame in the second GOP. Alignment processing is performed towards the target frame by using the cross-GOP motion vector, to generate the alignment frame, thereby ensuring accuracy of cross-GOP frame "alignment".

In an example, when the target frame is the I2 frame (the first frame in the second GOP), the performing alignment processing means that the P3 frame in the first GOP moves a pixel block towards the I2 frame based on the cross-GOP motion vector, and the P4 frame in the second GOP moves a pixel block towards the I2 frame based on a motion vector, to generate two alignment frames.

When motion estimation is performed by using a motion vector, based on an accuracy requirement, a motion vector at a pixel level or subpixel level of an inter-frame pixel block may be used for estimation, and motion compensation information such as a residual is obtained through calculation based on the motion vector. Specifically, for a correspondence between the motion vector, the alignment frame, and the residual, refer to the related description of the formulas in Embodiment 1. Details are not described again in this embodiment.

In this embodiment, in the coding process, a motion vector (that is, the cross-GOP motion vector) between GOPs that are adjacent in time sequence is added to perform motion estimation, and the video stream is generated, so as to provide a continuous motion vector for a frame alignment operation in a subsequent decoding phase, thereby ensuring continuity of inter prediction.

Step 703: A decoder obtains the video stream. Specifically, in an implementation, the coder transmits the video stream to the cloud, and the decoder downloads and obtains the video stream from the cloud. Alternatively, in another implementation, the coder directly transmits a coded video stream to the decoder.

Step 704: The decoder decrypts the video stream to obtain information such as at least one video frame, a motion vector and a residual that are between neighboring frames. The motion vector includes a motion vector between two neighboring frames in a same GOP, and further includes the cross-GOP motion vector. In addition, the motion vector further includes a residual between every two neighboring video frames.

Step 705: The decoder performs, based on information such as the video frame, the motion vector, and the residual, preprocessing on an image on which super resolution is to be performed, to generate at least one alignment frame and at least one residual frame, which specifically includes the following steps.

Step 7051: "Align" a previous frame and a subsequent frame of the target frame with the target frame based on their respective motion vectors, to generate a first alignment frame and a second alignment frame.

In a process of generating an alignment frame, to improve precision of a super resolution image, precision of the motion vector may be divided into a pixel and a subpixel. For a motion vector with pixel precision, the alignment frame may be generated based on a normal alignment operation.

For a motion vector with subpixel precision, a video frame needs to be first amplified before alignment is performed, and then an aligned image is restored to a size of the original image. This specifically includes the following: A plurality of consecutive neighboring video frames are extracted, an image on which super resolution is to be performed is selected as a target frame, and remaining frames are previous and subsequent auxiliary frames. Each of the previous auxiliary frame and subsequent auxiliary frame moves a pixel to a specified location based on a motion vector between the target frame and each of the previous auxiliary frame and subsequent auxiliary frame by using Formula 4.

$$(x',y')=(x+mv_x, y+mv_y) \quad \text{(Formula 4), where}$$

(x', y') represents a location of the pixel after movement, (x,y) represents an original location of the pixel, and ($mv_x$, $mv_y$) represents the motion vector.

In addition, when alignment processing is performed, for a motion vector with subpixel precision, consecutive video frames are first amplified and aligned, and then alignment frames are restored to sizes of the original images. This is because when calculating a motion vector with subpixel precision, a codec first amplifies the current target frame by a multiple of corresponding pixel precision, and then calculates a motion vector between the current target frame and the previous auxiliary frame, and the motion vector with subpixel precision obtained in this case is not an integer (that is, a decimal). In the alignment process, first, an image corresponding to an amplification multiple is established for each of a plurality of consecutive video frames and is buffered. An image on which super resolution is to be performed is a target frame, and a remaining frame is an auxiliary frame. Then, the auxiliary frame moves a pixel to a specified location based on a motion vector between the auxiliary frame and the current target frame and a super-resolution amplification multiple by using Formula 5.

$$(x',y')=(x+mv_x \times \text{factor}, y+mv_y \times \text{factor}) \quad \text{(Formula 5), where}$$

"factor" represents the super-resolution amplification multiple, (x',y') represents a location of the pixel after movement, (x,y) represents an original location of the pixel, and ($mv_x$, $mv_y$) represents the motion vector.

In this embodiment, the video frame is amplified and moved, so that only $$\frac{1}{factor^2}$$

pixels have a pixel value, and all remaining pixels are 0. To reduce an amount of data subsequently input to a super resolution model, an amplified image is buffered and weighted, and a size of an original image frame is obtained through sampling, to complete alignment. In addition, when macroblock alignment is performed by using subpixel precision, a changed region can more precisely fall into a pixel in a macroblock, thereby improving alignment precision.

Step 7052: Perform residual accumulation based on a key frame and the residual between the two neighboring frames, to generate at least one residual frame related to the target frame.

The key frame is a first frame in each GOP. In step 7052, residuals may be accumulated by using a back tracing technology to generate at least one residual frame.

The residuals are accumulated in the backtracking technology, so that a correspondence between each auxiliary frame in each GOP and the key frame (the first frame) is obtained, which can be understood as that each auxiliary frame is expressed by the key frame and an accumulated residual.

In an example, a process of generating the at least one residual frame by using the P3 frame, the I2 frame, and the P4 frame in the foregoing two GOPs as the first frame of image, the second frame of image, and the third frame of image, and using the I2 frame as a target frame on which super resolution is to be performed includes the following:

(1) For a residual frame of the P3 frame, an expression of a relationship between the P3 frame and the I1 frame in the first GOP is obtained according to Formula 1 to Formula 3 in the Embodiment 1:

$$I_i^{(t4)} = I_{i-T_i^{(t2)}-T_i^{(t3)}-T_i^{(t4)}}^{(t1)} + \Delta_i^{(t2)} + \Delta_i^{(t3)} + \Delta_i^{(t4)},$$

where
$I_i^{(t4)}$ represents the P3 frame, $$I_{i-T_i^{(t2)}-T_i^{(t3)}-T_i^{(t4)}}^{(t1)}$$

represents an alignment frame generated after the P3 frame is aligned with the I2 frame based on the cross-GOP motion vector, t1 is a generation moment of the I1 frame of image, t2 is a generation moment of the P1 frame of image, t3 is a generation moment of the P2 frame of image, t4 is a generation moment of the P3 frame of image, $\Delta_i^{(t2)}$ represents a residual between the I1 frame and the P1 frame, $\Delta_i^{(t3)}$ represents a residual between the P1 frame and the P2 frame, $\Delta_i^{(t4)}$ represents a residual between the P2 frame and the P3 frame, $\Delta_i^{(t2)}+\Delta_i^{(t3)}+\Delta_i^{(t4)}$ represents an accumulated residual between the I1 frame and the P3 frame, i represents a macroblock in an image, and $i-T_i^{(t2)}-T_i^{(t3)}-T_i^{(t4)}$ represents a macroblock obtained after the macroblock i moves based on a motion vector corresponding to the macroblock i.

A first residual frame is generated based on the accumulated residual $\Delta_i^{(t2)}+\Delta_i^{(t3)}+\Delta_i^{(t4)}$ between the I1 frame and the P3 frame.

(2) For a residual frame of the I2 frame, because the I2 frame is the first frame in the second GOP, a residual of the I2 frame is 0.

(3) For a residual frame of the P4 frame, because the P4 frame is the second frame in the second GOP, a correspondence that is between the P4 frame and the I2 frame and that is obtained according to Formula 2 is:

$$I_i^{(t6)} = I_{i-T_i^{(t6)}}^{(t5)} + \Delta_i^{(t6)},$$

where
$I_i^{(t6)}$ represents the P4 frame, $$I_{i-T_i^{(t6)}}^{(t5)}$$

represents an alignment frame generated after the P4 frame is aligned with the I2 frame based on a motion vector, t5 is a generation moment of the I2 frame of image, t6 is a generation moment of the P4 frame of image, $\Delta_i^{(t6)}$ represents a residual between the I2 frame and the P4 frame, i represents a macroblock in an image, and $i-T_i^{(t6)}$ represents a macroblock obtained after the macroblock i moves based on a motion vector $T_i^{(t6)}$ corresponding to the macroblock i.

A second residual frame is generated based on an accumulated residual $\Delta_i^{(t6)}$ between the I2 frame and the P4 frame.

In this embodiment, a correspondence between a first frame and any subsequent frame in each GOP may be obtained through calculation, and a correspondence between the key frame I1 generated at the moment t1 and the images generated at t2, t3, and t4 is directly established without relying on an expression of a relationship between two neighboring frames, so that interdependence between two neighboring P frames is broken, thereby avoiding storing a correspondence between two consecutive frames. Therefore, storage space is reduced in the method. In addition, a generated accumulated residual frame includes related redundant information in terms of time sequence, so as to provide more original information for subsequent detail restoration of a moving body.

Step 706: Determine whether a to-be generated image is a first frame in the video stream, where the first frame is a first video frame played by the video stream, that is, the I1 frame in the first GOP.

If the to-be generated image is not the first frame, steps 707 to 709 are performed; or if the to-be generated image is the first frame, step 710 is performed.

Step 707: For a non-I1 frame, divide the at least one residual frame and the alignment frame into a region of interest and a non-region of interest.

Specifically, a possible selection process includes: selecting a super-resolution region of interest by using motion vector information and residual information. If a region has less texture information in a residual accumulation map, the region is a non-region of interest, and a super resolution result of the region in a previous frame can be directly used, thereby reducing an amount of super resolution calculation on the frame. Alternatively, if a region has much texture information in the residual accumulation map, the region is a region of interest, and super resolution processing needs to be performed on the region. Further, the region of interest may be determined by using Formula 6 and Formula 7:

$$I_{SP} = \bigcup_{i=1}^{I} I_{residual} \times \text{sign}\left(\sum_{k=1}^{K} i_k / 255\right); \text{ and} \quad \text{(Formula 6)}$$

$$\text{sign}(x) = \begin{cases} 0 & x < \text{Threshold} \\ 1 & x \geq \text{Threshold} \end{cases}. \quad \text{(Formula 7)}$$

$I_{SR}$ represents a set of macroblocks in all regions of interest, K represents a total quantity of pixels in each macroblock, $I_{residual}$ represents a current image macroblock, $i_k$ represents a pixel value of a $k^{th}$ pixel, and sign(x) is a symbol function, which may be specifically defined by Formula 7, where $x=\Sigma_{k=1}^{K} i_k/255$. I represents a quantity of macroblocks in the target frame, and the function ∪ represents obtaining a union set of macroblocks. A threshold (Threshold) is a constant and may be preset. Formula 7 indicates that if the sum of all pixel values in a specific macroblock is less than a preset threshold, sign(x)=0 and the macroblock is a macroblock in a non-region of interest. If sign(x)=1, a macroblock corresponding to the pixel value $i_k$ is a region of interest, and super resolution processing needs to be performed on the macroblock. Then, a union set of macroblocks in all regions of interest is obtained, and is used as a multi-texture region on which super resolution processing needs to be performed.

Step 7081: A macroblock in the non-region of interest uses a super resolution processing result of a previous frame. For the macroblock in the non-region of interest, image information obtained by performing super resolution on macroblocks in all non-regions of interest in the previous frame is extracted. The image information includes a super resolution result of a macroblock at a corresponding location in the previous frame of image.

Step 7082: Send a macroblock in the region of interest to a neural network for super resolution processing. The macroblock in the region of interest is a region of interest in the following frame.

In an example, macroblocks in regions of interest in the first alignment frame and the second alignment frame generated in step 7051 and the target frame I2 are sent to the neural network, and macroblocks in regions of interest in the first residual frame and the second residual frame generated in step 7052 are sent to the neural network, to respectively obtain a luminance channel and high-frequency information related to the target frame I2.

Figure 7B:
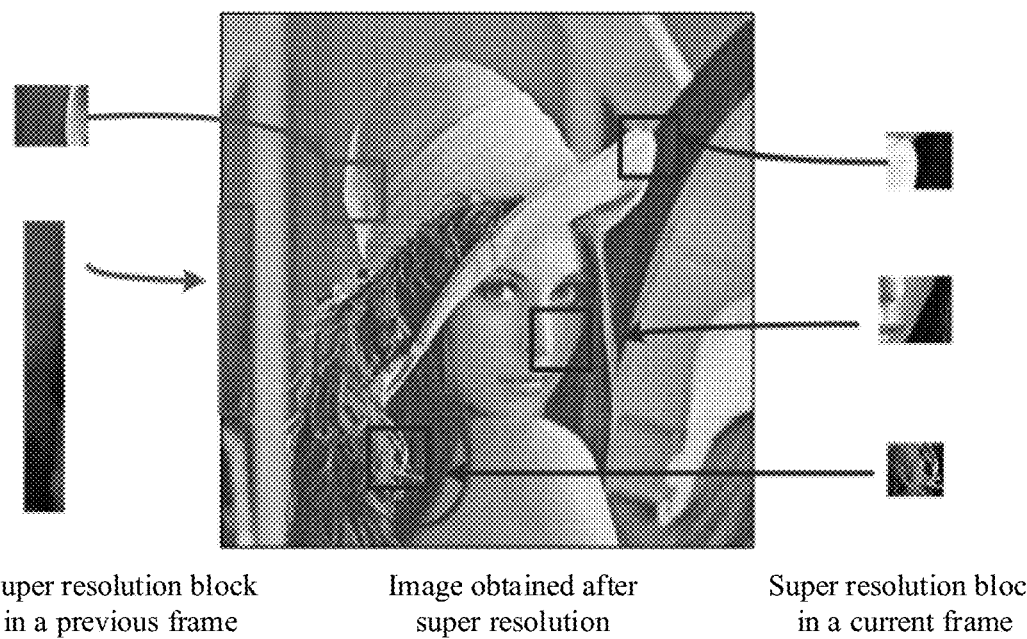
FIG. 7B is a schematic diagram of generating, by combining super resolution effects, an image obtained after super resolution according to an embodiment of this application.

Step 709: Merge the luminance channel with the high-frequency information to obtain an image obtained after super resolution, as shown in FIG. 7B.

The neural network includes a feature extraction network and a super resolution network. Further, the feature extraction network is configured to perform feature extraction on the input at least one alignment frame and at least one residual frame to respectively obtain a feature map of the alignment frame and a feature map of the residual frame. The feature extraction network may be a shared network. To be specific, the feature extraction network is shared by the alignment frame and the residual frame for feature extraction, thereby improving parameter utilization and decreasing a quantity of parameters in the neural network. Then, the extracted feature maps are respectively sent to different super resolution networks. The luminance channel is output after the feature map obtained by the alignment frame passes through a first super resolution network, and the high-frequency information is output after the feature map obtained by using the residual frame passes through a second super resolution network. Finally, the high-frequency information is attached back to the luminance channel, to enhance an edge detail and high-frequency information of an image on which super resolution is to be performed, so as to finally obtain a super resolution image with high quality.

Step 710: In step 706, if the image on which super resolution is to be performed is the first frame, skip performing division of a region of interest, and directly input the generated alignment frame and residual frame to the neural model for super resolution processing to obtain an image obtained after super resolution. Because the first frame does not have a previous frame and a super resolution result of the previous frame, division of a region of interest and a non-region of interest does not need to be performed, and super resolution needs to be performed on an entire image.

Alternatively, if the image has a previous image, an output result needs to be concatenated with the super resolution result of the previous frame corresponding to the non-region of interest in step 7081, to obtain a complete super resolution result of a current frame. As shown in FIG. 7B, three super resolution blocks in a current frame, which are respectively a hat brim, a nose, and a hat decoration tassel, are merged with a super resolution block in a previous frame, to obtain an image obtained after super resolution.

In this embodiment, when the frame on which super resolution is to be performed is not the first frame in the video stream, division of the region of interest and the non-region of interest are performed. In addition, super resolution processing in performed on only the macroblock in the region of interest, and the macroblock in the non-region of interest uses the super resolution result of the previous frame. To be specific, super resolution is performed on a region in which a pixel moves and information exists in an accumulated residual, and for a module in which a pixel does not move and an information amount of an accumulated residual is relatively small, a super resolution result of a precious frame is used or an interpolation is used for amplification, so as to avoid performing super resolution processing on all macroblocks in an entire image. In the method, an amount of calculation input to the neural network and calculation time are reduced, thereby improving super resolution efficiency.

In addition, using macroblocks at a same location in alignment frames is performing complementing between same details, and this redundancy provides a larger amount of information. The residual is actually compensation for a difference between blocks whose pixels are matched, and includes information such as an edge of a moving body. In this embodiment, residuals are accumulated to obtain a residual frame, and a high-frequency edge of an image is restored by using the residual, so that a subjective effect is better. In addition, calculation amounts allocated to different chips may be dynamically adjusted based on a load capacity of a chip of a terminal device, so as to reduce a delay.

Figure 8:
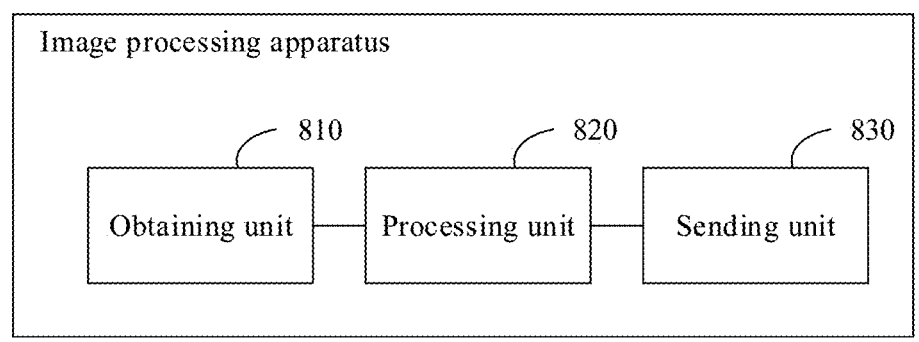
FIG. 8 is a schematic diagram of a structure of an image processing apparatus according to an embodiment of this application.

In addition, the method described in the foregoing embodiment of this application may implement a corresponding function by using a software module. As shown in FIG. 2B, the video decoding system 40 includes the processing unit 46. Alternatively, as shown in FIG. 8, an image processing apparatus is provided. The apparatus includes an obtaining unit 810, a processing unit 820, and a sending unit 830, and may further include another functional module or unit, such as a storage unit.

In an embodiment, the image processing apparatus may be configured to perform the image processing procedures in FIG. 5, FIG. 6, and FIG. 7A(1) and FIG. 7A(2). For example, the obtaining unit 810 is configured to obtain a video stream, where the video stream includes a first frame of image, a second frame of image, and a third frame of image that are adjacent in time sequence. The processing unit 820 is configured to decode the video stream to obtain a first alignment frame, a second alignment frame, and at least one residual between the first frame of image, the second frame of image, and the third frame of image. The processing unit 820 is further configured to: generate at least one residual frame based on the at least one residual, and perform super resolution processing on the second frame of image based on the at least one residual frame, the first alignment frame, and the second alignment frame to obtain a second frame of image obtained after super resolution.

The sending unit 830 is configured to output the second frame of image obtained after super resolution to a display screen for display.

The first alignment frame is generated after the first frame of image moves a pixel block towards the second frame of image based on a first motion vector, the second alignment frame is generated after the third frame of image moves a pixel block towards the second frame of image based on a second motion vector, and the residual is a pixel difference between each macroblock in a previous frame of image and each macroblock in a subsequent frame of image after the previous frame of image performs motion compensation towards the subsequent frame of image based on a motion vector.

Optionally, the first frame of image, the second frame of image, and the third frame of image are three frames of images in a first group of pictures; or the first frame of image is a last frame of image in the first group of pictures, and the second frame of image and the third frame of image are the first two frames of images in a second group of pictures; or the first frame of image and the second frame of image are the last two frames of images in the first group of pictures, and the third frame of image is a first frame of image in the second group of pictures.

In this embodiment of this application, the three frames of images selected from the video stream are not limited, and a specific frame selected from the three frames of images as an image on which super resolution is to be performed is not limited.

In a possible implementation of this embodiment, the processing unit 820 is specifically configured to generate a first residual frame. The first residual and the first alignment frame satisfy the following relationship:

$$I_i^{(t2)} = I_{i-T_i^{(t2)}}^{(t1)} + \Delta_i^{(t2)},$$

where $I_i^{(t2)}$ represents the second frame of image, $I_{i-T_i^{(t2)}}^{(t1)}$ represents the first alignment frame, $\Delta_i^{(t2)}$ represents the first residual, i represents a macroblock in the first frame of image, $i-T_i^{(t2)}$ represents a macroblock obtained after the macroblock i moves based on a motion vector $T_i^{(t2)}$ corresponding to the macroblock i, t1 represents a generation moment of the first frame of image, and t2 represents a generation moment of the second frame of image.

In another possible implementation of this embodiment, the processing unit 820 is specifically configured to:

input the at least one residual frame to a neural network for feature extraction to obtain at least one first feature map;

input the first alignment frame, the second alignment frame, and the second frame of image to the neural network for feature extraction to obtain at least one second feature map;

input the at least one first feature map to a first super resolution network for processing to generate high-frequency information;

input the at least one second feature map to a second super resolution network for processing to generate a luminance channel; and merge the high-frequency information with the luminance channel to generate the second frame of image obtained after super resolution.

In still another possible implementation of this embodiment, the processing unit 820 is further configured to: determine a macroblock in a region of interest in the first residual frame, and determine a region of interest in a remaining residual frame other than the first residual frame in the at least one residual frame based on the macroblock in the region of interest in the first residual frame. The macroblock in the region of interest is a macroblock that is included in a current macroblock and in which the sum of all pixel values exceeds a preset value.

In addition, the processing unit 820 is further specifically configured to input macroblocks in all regions of interest in the at least one residual frame to the neural network for feature extraction. The at least one residual frame includes the first residual frame and the remaining residual frame.

In still another possible implementation of this embodiment, the processing unit 820 is specifically configured to input macroblocks in regions of interest in the first alignment frame and the second alignment frame, and the second frame of image to the neural network for feature extraction. The regions of interest in the first alignment frame and the second alignment frame each are the same as the region of interest in the first residual frame.

Figure 9:
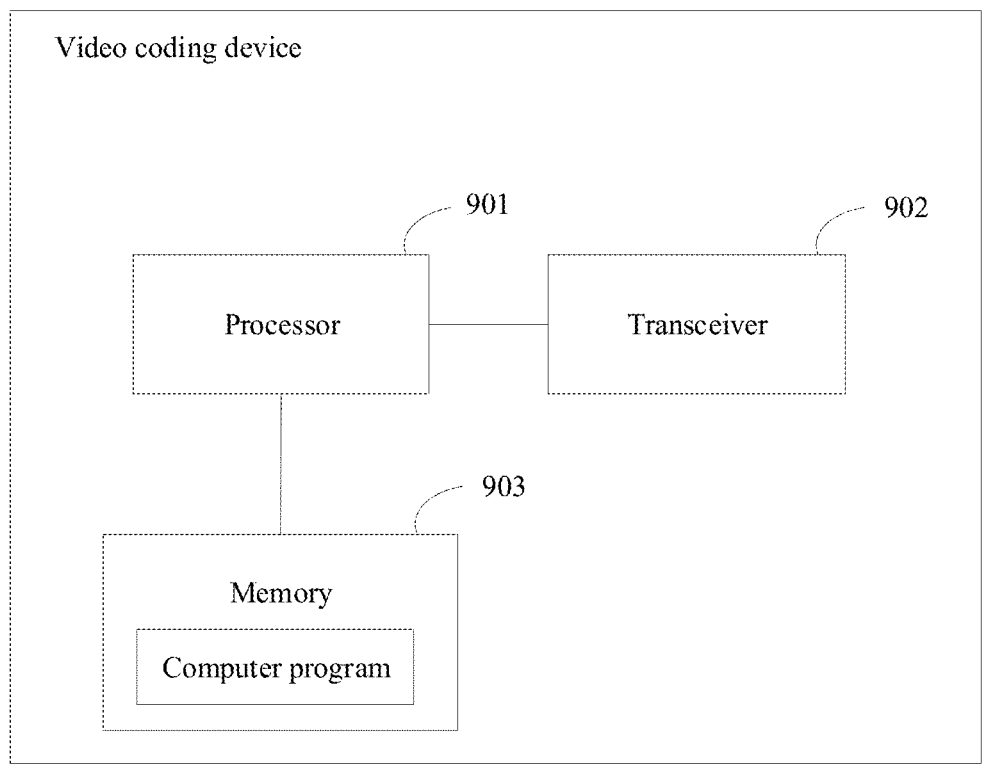
FIG. 9 is a schematic diagram of a structure of a video decoder according to an embodiment of this application.

FIG. 9 is a schematic diagram of another possible structure of a video coding device in the foregoing embodiment. The video coding device includes a processor 901, a transceiver 902, and a memory 903. As shown in FIG. 9, the memory 903 is configured to be coupled to the processor 901, and stores a computer program necessary for the video coding device.

For example, in an embodiment, the transceiver 902 is configured to transmit coding information to the decoder 30. The processor 901 is configured to perform a coding operation or function of the video coding device.

Further, the transceiver 902 is configured to obtain a video stream. The processor 901 may be configured to: decode the video stream to obtain a first alignment frame, a second alignment frame, and at least one residual between a first frame of image, a second frame of image, and a third frame of image; generate at least one residual frame based on the at least one residual; and perform super resolution processing on the second frame of image based on the at least one residual frame, the first alignment frame, and the second alignment frame to obtain a second frame of image obtained after super resolution.

In a specific implementation, the processor 901 is further configured to: input the at least one residual frame to a neural network for feature extraction to obtain at least one first feature map; input the first alignment frame, the second alignment frame, and the second frame of image to the neural network for feature extraction to obtain at least one second feature map; input the at least one first feature map to a first super resolution network for processing to generate high-frequency information; input the at least one second feature map to a second super resolution network for processing to generate a luminance channel; and merge the high-frequency information with the luminance channel to generate the second frame of image obtained after super resolution.

In another specific implementation, the processor 901 may be further configured to: determine a macroblock in a region of interest in the first residual frame, where the macroblock in the region of interest is a macroblock that is included in a current macroblock and in which the sum of all pixel values exceeds a preset value; determine a region of interest in a remaining residual frame other than the first residual frame in the at least one residual frame based on the macroblock in the region of interest in the first residual frame; and input macroblocks in all regions of interest in the at least one residual frame to the neural network for feature extraction, where the at least one residual frame includes the first residual frame and the remaining residual frame.

In still another specific implementation, the processor 901 is further specifically configured to input macroblocks in regions of interest in the first alignment frame and the second alignment frame, and the second frame of image to the neural network for feature extraction. The regions of interest in the first alignment frame and the second alignment frame each are the same as the region of interest in the first residual frame.

Specifically, for an implementation process of the processor 901, refer to the description of Embodiment 1 and Embodiment 2, and FIG. 5, FIG. 6, and FIG. 7A(1) and FIG. 7A(2). Details are not described herein again in this embodiment.

The video decoding device provided in this embodiment further includes a computer storage medium. The computer storage medium may store computer program instructions, and when the program instructions are executed, all steps of the image processing method described in the foregoing embodiments of this application may be implemented. The computer-readable storage medium may be a magnetic disk, an optical disc, a read-only memory ROM, a random access memory RAM, or the like.

All or some of the foregoing embodiments may be implemented by using software, hardware, firmware, or any combination thereof. When the embodiments are implemented by using software, the embodiments may be completely or partially implemented in a form of a computer program product. This is not limited in this embodiment.

This application further provides a computer program product, and the computer program product includes one or more computer program instructions. When the computer program instructions are loaded and executed on a computer, all or some of the procedures or functions according to the foregoing embodiments of this application are generated. The computer may be a general-purpose computer, a dedicated computer, a computer network, or another programmable apparatus.

The computer program instructions may be stored in a computer-readable storage medium or may be transmitted from a computer-readable storage medium to another computer-readable storage medium. For example, the computer instructions may be transmitted from one network node, computer, server, or data center to another website, computer, or server in a wired or wireless manner.

Further, when the program is executed, some or all of the steps in the embodiments including the video coding method and the video decoding method provided in FIG. 2A to FIG. 7A(2) may be implemented. A storage medium in any device may be a magnetic disk, an optical disc, a read-only memory (read-only memory, ROM), a random access memory (random access memory, RAM), or the like.

In this embodiment of this application, the processor 901 may be a central processing unit (central processing unit, CPU), a network processor (network processor, NP), or a combination of a CPU and an NP. The processor may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable gate array (field-programmable gate array, FPGA), a generic array logic (generic array logic, GAL), or any combination thereof. The memory may include a volatile memory (volatile memory), for example, a random access memory (random-access memory, RAM); the memory may also include a non-volatile memory (non-volatile memory), for example, a read-only memory (read-only memory, ROM), a flash memory (flash memory), a hard disk drive (hard disk drive, HDD), or a solid-state drive (solid-state drive, SSD); and the memory may further include a combination of the foregoing types of memories.

A person skilled in the art may further understand that various illustrative logical blocks (illustrative logic block) and steps (step) that are listed in this application may be implemented by using electronic hardware, computer software, or a combination thereof. Whether the functions are implemented by using hardware or software depends on particular applications and a design requirement of the entire system. A person skilled in the art may use various methods to implement the described functions for each particular application, but it should not be considered that the implementation goes beyond the scope of this application.

The various illustrative logical units and circuits described in the embodiments of this application may implement or operate the described functions through a general-purpose processor, a digital signal processor, an application-specific integrated circuit (ASIC), a field programmable gate array (FPGA), another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, for example, a digital signal processor and a microprocessor, a plurality of microprocessors, one or more microprocessors in combination with a digital signal processor core, or any other similar configuration.

Steps of the methods or algorithms described in this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to a processor, so that the processor may read information from the storage medium and write information to the storage medium. Optionally, the storage medium may alternatively be integrated into the processor. The processor and the storage medium may be disposed in an ASIC, and the ASIC may be disposed in UE. Optionally, the processor and the storage medium may be disposed in different components of the UE.

It should be understood that sequence numbers of the foregoing processes do not mean execution sequences in the embodiments of this application. The execution sequences of the processes should be determined based on functions and internal logic of the processes, and should not be construed as any limitation on the implementation processes of this application.

In the specification, claims, and accompanying drawings of the embodiments of this application, terms such as "first", "second", and "third" are intended to distinguish between similar objects but do not necessarily indicate a specific order or sequence. It should be understood that data used in such a way are interchangeable in proper circumstances so that the embodiments described herein can be implemented in an order other than orders illustrated or described herein. Moreover, terms "include", "comprise", and any other variants mean to cover non-exclusive inclusion, for example, a process, method, system, product, or device that includes a list of steps or units is not necessarily limited to those steps or units, but may include other steps or units not expressly listed or inherent to such a process, method, product, or device.

A person skilled in the art may clearly understand that, the technologies in the embodiments of this application may be implemented by software in addition to a necessary general hardware platform. Based on such an understanding, the technical solutions of the embodiments of this application essentially or the part contributing to the conventional technology may be implemented in a form of a software product. The computer software product may be stored in a storage medium, such as a ROM/RAM, a magnetic disk, an optical disc and the like, and includes several instructions for instructing a computer device (which may be a personal computer, a server, or a network device and the like) to perform the methods described in the embodiments or some parts of the embodiments of the present invention.

For same or similar parts in the embodiments in this specification, refer to each other. Especially, a network device/node or an apparatus device is basically similar to a method embodiment, and therefore is described briefly. For related parts, refer to the descriptions of the method embodiments.

The foregoing implementations of this application do not constitute a limitation on the protection scope of this application.

What is claimed is:

1. An image processing method, wherein the method comprises:
    obtaining a video stream, wherein the video stream comprises a first frame of image, a second frame of image, and a third frame of image that are adjacent in time sequence;
    decoding the video stream to obtain a first alignment frame, a second alignment frame, and at least one residual between the first frame of image, the second frame of image, and the third frame of image, wherein the first alignment frame is generated after the first frame of image moves a pixel block towards the second frame of image based on a first motion vector, the second alignment frame is generated after the third frame of image moves a pixel block towards the second frame of image based on a second motion vector, and each residual of the at least one residual is a pixel difference between a first macroblock in a previous frame of image and a second macroblock corresponding to the first macroblock in a subsequent frame of image after the previous frame of image performs motion compensation towards the subsequent frame of image based on a motion vector;
    generating at least one residual frame based on the at least one residual; and
    performing super resolution processing on the second frame of image based on the at least one residual frame, the first alignment frame, and the second alignment frame to obtain an additional second frame of image obtained after super resolution, wherein performing the super resolution processing comprises:
        generating high-frequency information based on the at least one residual frame;
        generating a luminance channel based on the first alignment frame, the second alignment frame, and the second frame of image; and
        merging the high-frequency information with the luminance channel to generate the additional second frame of image.

2. The method according to claim 1, wherein generating the at least one residual frame based on the at least one residual comprises:
    generating a first residual frame based on a first residual, wherein the first residual and the first alignment frame satisfy the following relationship:

$$I_i^{(t2)} = I_{i-T_i^{(t2)}}^{(t1)} + \Delta_i^{(t2)},$$

wherein
$I_i^{(t2)}$ represents the first alignment frame, $$I_{i-T_i^{(t2)}}^{(t1)}$$

represents the second frame of image, $\Delta_i^{(t2)}$ represents the first residual, i represents a macroblock in the first frame of image, $i-T_i^{(t2)}$ represents a macroblock obtained after the macroblock i moves based on a motion vector $T_i^{(t2)}$ corresponding to the macroblock i, t1 represents a generation moment of the first frame of image, and t2 represents a generation moment of the second frame of image.

3. The method according to claim 1, wherein performing the super resolution processing comprises:
    inputting the at least one residual frame to a neural network for feature extraction to obtain at least one first feature map;
    inputting the first alignment frame, the second alignment frame, and the second frame of image to the neural network for feature extraction to obtain at least one second feature map;
    inputting the at least one first feature map to a first super resolution network for processing to generate the high-frequency information; and
    inputting the at least one second feature map to a second super resolution network for processing to generate the luminance channel.

4. The method according to claim 3, before inputting the at least one residual frame to the neural network for feature extraction, further comprising:
   determining a macroblock in a region of interest in a first residual frame, wherein the macroblock in the region of interest is a macroblock that is in a current macroblock and in which a sum of all pixel values exceeds a preset value; and
   determining a region of interest in a remaining residual frame other than the first residual frame in the at least one residual frame based on the macroblock in the region of interest in the first residual frame, wherein inputting the at least one residual frame to the neural network for feature extraction comprises:
   inputting macroblocks in all regions of interest in the at least one residual frame to the neural network for feature extraction, wherein the at least one residual frame comprises the first residual frame and the remaining residual frame.

5. The method according to claim 4, wherein inputting the first alignment frame, the second alignment frame, and second frame of image to the neural network for feature extraction comprises:
   inputting macroblocks in regions of interest in the first alignment frame and the second alignment frame, and the second frame of image to the neural network for feature extraction, wherein each of the regions of interest in the first alignment frame and the second alignment frame is the same as the region of interest in the first residual frame.

6. The method according to claim 1, wherein:
   the first frame of image, the second frame of image, and the third frame of image are three frames of images in a first group of pictures;
   the first frame of image is a last frame of image in the first group of pictures, and the second frame of image and the third frame of image are first two frames of images in a second group of pictures; or
   the first frame of image and the second frame of image are last two frames of images in the first group of pictures, and the third frame of image is a first frame of image in the second group of pictures.

7. An image processing apparatus, wherein the apparatus comprises:
   at least one processor; and
   one or more memories coupled to the at least one processor and storing programming instructions for execution by the at least one processor to:
      obtain a video stream, wherein the video stream comprises a first frame of image, a second frame of image, and a third frame of image that are adjacent in time sequence;
      decode the video stream to obtain a first alignment frame, a second alignment frame, and at least one residual between the first frame of image, the second frame of image, and the third frame of image, wherein the first alignment frame is generated after the first frame of image moves a pixel block towards the second frame of image based on a first motion vector, the second alignment frame is generated after the third frame of image moves a pixel block towards the second frame of image based on a second motion vector, and each residual of the at least one residual is a pixel difference between a first macroblock in a previous frame of image and a second macroblock corresponding to the first macroblock in a subsequent frame of image after the previous frame of image performs motion compensation towards the subsequent frame of image based on a motion vector;
      generate at least one residual frame based on the at least one residual; and
      perform super resolution processing on the second frame of image based on the at least one residual frame, the first alignment frame, and the second alignment frame to obtain an additional second frame of image obtained after super resolution, wherein performing the super resolution processing comprises:
         generating high-frequency information based on the at least one residual frame;
         generating a luminance channel based on the first alignment frame, the second alignment frame, and the second frame of image; and
         merging the high-frequency information with the luminance channel to generate the additional second frame of image.

8. The apparatus according to claim 7, wherein generating the at least one residual frame based on the at least one residual comprises:
   generating a first residual frame based on a first residual, wherein the first residual and the first alignment frame satisfy the following relationship:

$$I_i^{(t2)} = I_{i-T_i^{(t2)}}^{(t1)} + \Delta_i^{(t2)},$$

wherein
   $I_i^{(t2)}$ represents the second frame of image, $$I_{i-T_i^{(t2)}}^{(t1)}$$

represents the second frame of image, $\Delta_i^{(t2)}$ represents the first residual, i represents a macroblock in the first frame of image, $i-T_i^{(t2)}$, represents a macroblock obtained after the macroblock i moves based on a motion vector $T_i^{(t2)}$ corresponding to the macroblock i, t1 represents a generation moment of the first frame of image, and t2 represents a generation moment of the second frame of image.

9. The apparatus according to claim 7, wherein the programming instructions are for execution by the at least one processor to:
   input the at least one residual frame to a neural network for feature extraction to obtain at least one first feature map;
   input the first alignment frame, the second alignment frame, and the second frame of image to the neural network for feature extraction to obtain at least one second feature map;
   input the at least one first feature map to a first super resolution network for processing to generate the high-frequency information; and
   input the at least one second feature map to a second super resolution network for processing to generate the luminance channel.

10. The apparatus according to claim 9, wherein the programming instructions are for execution by the at least one processor to:
   determine a macroblock in a region of interest in a first residual frame, and determine a region of interest in a remaining residual frame other than the first residual frame in the at least one residual frame based on the macroblock in the region of interest in the first residual frame, wherein the macroblock in the region of interest is a macroblock that is in a current macroblock and in which a sum of all pixel values exceeds a preset value; and input macroblocks in all regions of interest in the at least one residual frame to the neural network for feature extraction, wherein the at least one residual frame comprises the first residual frame and the remaining residual frame.

11. The apparatus according to claim 10, wherein the programming instructions are for execution by the at least one processor to:

input macroblocks in regions of interest in the first alignment frame and the second alignment frame, and the second frame of image to the neural network for feature extraction, wherein each of the regions of interest in the first alignment frame and the second alignment frame is the same as the region of interest in the first residual frame.

12. The apparatus according to claim 7, wherein:

the first frame of image, the second frame of image, and the third frame of image are three frames of images in a first group of pictures;

the first frame of image is a last frame of image in the first group of pictures, and the second frame of image and the third frame of image are first two frames of images in a second group of pictures; or the first frame of image and the second frame of image are last two frames of images in the first group of pictures, and the third frame of image is a first frame of image in the second group of pictures.

13. A non-transitory computer-readable storage medium storing programming instructions for execution by at least one processor, that when executed by the at least one processor, cause a computer to perform operations comprising:

obtaining a video stream, wherein the video stream comprises a first frame of image, a second frame of image, and a third frame of image that are adjacent in time sequence;

decoding the video stream to obtain a first alignment frame, a second alignment frame, and at least one residual between the first frame of image, the second frame of image, and the third frame of image, wherein the first alignment frame is generated after the first frame of image moves a pixel block towards the second frame of image based on a first motion vector, the second alignment frame is generated after the third frame of image moves a pixel block towards the second frame of image based on a second motion vector, and each residual of the at least one residual is a pixel difference between a first macroblock in a previous frame of image and a second macroblock corresponding to the first macroblock in a subsequent frame of image after the previous frame of image performs motion compensation towards the subsequent frame of image based on a motion vector;

generating at least one residual frame based on the at least one residual; and performing super resolution processing on the second frame of image based on the at least one residual frame, the first alignment frame, and the second alignment frame to obtain an additional second frame of image obtained after super resolution, wherein performing the super resolution processing comprises:

generating high-frequency information based on the at least one residual frame;

generating a luminance channel based on the first alignment frame, the second alignment frame, and the second frame of image; and merging the high-frequency information with the luminance channel to generate the additional second frame of image.

14. The non-transitory computer-readable storage medium according to claim 13, wherein generating the at least one residual frame based on the at least one residual comprises:

generating a first residual frame based on a first residual, wherein the first residual and the first alignment frame satisfy the following relationship:

$$I_i^{(t2)} = I_{i-T_i^{(t2)}}^{(t1)} + \Delta_i^{(t2)},$$

wherein $I_i^{(t2)}$ represents the second frame of image, $$I_{i-T_i^{(t2)}}^{(t1)}$$

represents the first alignment frame, $\Delta_i^{(t2)}$ represents the first residual, i represents a macroblock in the first frame of image, $i-T_i^{(t2)}$ represents a macroblock obtained after the macroblock i moves based on a motion vector $T_i^{(t2)}$ corresponding to the macroblock i, t1 represents a generation moment of the first frame of image, and t2 represents a generation moment of the second frame of image.

15. The non-transitory computer-readable storage medium according to claim 13, wherein performing the super resolution processing comprises:

inputting the at least one residual frame to a neural network for feature extraction to obtain at least one first feature map;

inputting the first alignment frame, the second alignment frame, and the second frame of image to the neural network for feature extraction to obtain at least one second feature map;

inputting the at least one first feature map to a first super resolution network for processing to generate the high-frequency information; and inputting the at least one second feature map to a second super resolution network for processing to generate the luminance channel.

16. The non-transitory computer-readable storage medium according to claim 15, before inputting the at least one residual frame to the neural network for feature extraction, further comprising:

determining a macroblock in a region of interest in a first residual frame, wherein the macroblock in the region of interest is a macroblock that is in a current macroblock and in which a sum of all pixel values exceeds a preset value; and determining a region of interest in a remaining residual frame other than the first residual frame in the at least one residual frame based on the macroblock in the region of interest in the first residual frame, wherein inputting the at least one residual frame to the neural network for feature extraction comprises:
  inputting macroblocks in all regions of interest in the at least one residual frame to the neural network for feature extraction, wherein the at least one residual frame comprises the first residual frame and the remaining residual frame.

17. The non-transitory computer-readable storage medium according to claim 16, wherein inputting the first alignment frame, the second alignment frame, and the second frame of image to the neural network for feature extraction comprises:
  inputting macroblocks in regions of interest in the first alignment frame and the second alignment frame, and the second frame of image to the neural network for feature extraction, wherein each of the regions of interest in the first alignment frame and the second alignment frame is the same as the region of interest in the first residual frame.

18. The non-transitory computer-readable storage medium according to claim 13, wherein:
  the first frame of image, the second frame of image, and the third frame of image are three frames of images in a first group of pictures;
  the first frame of image is a last frame of image in the first group of pictures, and the second frame of image and the third frame of image are first two frames of images in a second group of pictures; or
  the first frame of image and the second frame of image are last two frames of images in the first group of pictures, and the third frame of image is a first frame of image in the second group of pictures.

\* \* \* \* \*

UNITED STATES PATENT AND TRADEMARK OFFICE
CERTIFICATE OF CORRECTION

PATENT NO. : 12,136,186 B2
APPLICATION NO. : 17/687298
DATED : November 5, 2024
INVENTOR(S) : Long Sun, Baiqi He and Meng Chen It is certified that error appears in the above-identified patent and that said Letters Patent is hereby corrected as shown below:

In the Claims

In Column 32, In Line 39, In Claim 2, delete "first alignment frame," and insert -- second frame of image, --.

In Column 32, In Line 45, In Claim 2, delete "second frame of image," and insert -- first alignment frame, --.

In Column 34, In Line 39, In Claim 8, delete "second frame of image," and insert -- first alignment frame, --.

In Column 34, In Line 41, In Claim 8, delete "i–$T_i^{(t2)}$," and insert -- i–$T_i^{(t2)}$ --.

Signed and Sealed this
Fourth Day of March, 2025

Coke Morgan Stewart
*Acting Director of the United States Patent and Trademark Office*